US011649322B2

(12) United States Patent
Sybert et al.

(10) Patent No.: US 11,649,322 B2
(45) Date of Patent: May 16, 2023

(54) SULFUR-STABILIZED COPOLYCARBONATES AND ARTICLES FORMED THEREFROM

(71) Applicant: SABIC GLOBAL TECHNOLOGIES B.V., Bergen op Zoom (NL)

(72) Inventors: Paul Dean Sybert, Mt. Vernon, IN (US); Roy Ray Odle, Mt. Vernon, IN (US); Jordi Calveras, Mt. Vernon, IN (US); Wei Zhao, Mt. Vernon, IN (US)

(73) Assignee: SHPP GLOBAL TECHNOLOGIES B.V., Bergen op Zoom (NL)

( * ) Notice: Subject to any disclaimer, the term of this patent is extended or adjusted under 35 U.S.C. 154(b) by 603 days.

(21) Appl. No.: 16/679,807

(22) Filed: Nov. 11, 2019

(65) Prior Publication Data

US 2020/0172665 A1 Jun. 4, 2020

(30) Foreign Application Priority Data

Nov. 30, 2018 (EP) .................................... 18209615

(51) Int. Cl.

*C08G 64/16* (2006.01)
*C08G 64/28* (2006.01)
*C08K 5/42* (2006.01)
*G02B 1/04* (2006.01)

(52) U.S. Cl.

CPC ........... *C08G 64/165* (2013.01); *C08G 64/28* (2013.01); *C08K 5/42* (2013.01); *G02B 1/041* (2013.01)

(58) Field of Classification Search

CPC .... C08G 64/165; C08G 64/28; C08G 64/081; C08G 64/14; C08K 5/42; G02B 1/041
USPC .......................................................... 524/158
See application file for complete search history.

(56) References Cited

U.S. PATENT DOCUMENTS 4,306,055 A 12/1981 Baron et al.
4,403,087 A 9/1983 Mark
4,471,104 A 9/1984 Krishnan et al.
4,699,971 A 10/1987 Mark et al.
4,904,717 A 2/1990 Ho et al.
4,939,185 A 7/1990 Nelson et al.
5,037,937 A * 8/1991 Komatsu .............. C08G 64/081 523/214
5,194,522 A 3/1993 Yang et al.
5,326,486 A 7/1994 Mizui et al.
5,344,910 A 9/1994 Sybert
5,502,153 A 3/1996 Sakashita et al.
5,717,057 A 2/1998 Sakashita et al.
6,635,710 B2 10/2003 Kono et al.
7,491,788 B1 2/2009 Leenders et al.
7,557,153 B2 7/2009 Mullen
7,968,671 B2 6/2011 Heuer et al.
8,064,140 B2 11/2011 Hoeks et al.
8,871,865 B2 10/2014 Jansen et al.
9,255,200 B2 2/2016 Kulkarni et al.
9,287,471 B2 3/2016 De Brouwer et al.
9,676,716 B2 6/2017 Heuer et al.
9,772,086 B2 9/2017 Van Den Bogerd et al.
9,868,817 B2 1/2018 Kohler et al.
2005/0245720 A1 11/2005 Yang et al.
2009/0088504 A1 4/2009 Chatterjee et al.
2012/0157653 A1 6/2012 Konig et al.
2013/0035441 A1 2/2013 De Brouwer et al.
2014/0063831 A1 3/2014 Lowery et al.
2014/0234629 A1 8/2014 Sun et al.
2014/0295363 A1 10/2014 Sun et al.
2016/0237210 A1 8/2016 Mahood et al.
2017/0022359 A1 1/2017 Farrell et al.
2018/0066135 A1 3/2018 Zhang et al.
2019/0023897 A1 1/2019 Sun et al.
2019/0300701 A1 10/2019 Van Der Mee et al.
2020/0172664 A1 6/2020 Sybert et al.
2020/0190003 A1 6/2020 Uchiyama et al.
2020/0339745 A1 10/2020 Sybert et al.

FOREIGN PATENT DOCUMENTS

CN 105968337 A 9/2016
EP 0084578 A1 1/1982
EP 0082383 A1 6/1983
EP 0046558 A2 3/1985

(Continued)

OTHER PUBLICATIONS

Das et al. "Computational linear rheology of general branch-on-branch polymers", The Society of Rehology, Inc. J. Rheol. 50(2), 207-234, (2006).
Nowakowska et al.; "Studies of Some Impurities in Commercial Bisphenol-A"; Polish Journal of Applied Chemistry; vol. XL, No. 3; 1996; pp. 247-254.
D.R. Bandura, V.I. Baranov, and S.D. Tanner; "Detection of Ultratrace Phosphorus and Sulfur by Quadrupole ICPMS with Dynamic Reaction Cell"; Anal. Chem. 74, 1497-1502 (2002).
L.L. Yu, W.R. Kelly, J.D. Fassett, and R.D. Vocke, J. Anal. At. Spectrum. 16, 140-145 (2001).

(Continued)

*Primary Examiner* — Frances Tischler
(74) *Attorney, Agent, or Firm* — Cantor Colburn LLP

(57) ABSTRACT

A copolycarbonate includes 0.005-0.1 mole percent of sulfur-containing carbonate units derived from a sulfur-containing bisphenol monomer, 2-95 mole percent of high heat carbonate units derived from a high heat aromatic dihydroxy monomer, and 5-98 mole percent of a low heat carbonate units derived from a low heat aromatic monomer, each based on the sum of the moles of the carbonate units; and optionally, thioether carbonyl endcaps of the formula —C(═O)-L-S—R, wherein L is a $C_{1-12}$ aliphatic or aromatic linking group and R is a $C_{1-20}$ alkyl, $C_{6-18}$ aryl, or $C_{7-24}$ arylalkylene; wherein the sulfur content of the high heat copolycarbonate in the absence of the thioether endcaps is from 5-20 parts per million by weight.

19 Claims, 1 Drawing Sheet

(56) References Cited

FOREIGN PATENT DOCUMENTS

| | | | |
|---|---|---|---|
| EP | 0278498 | A2 | 2/1988 |
| JP | 2001064380 | A | 3/2001 |
| JP | 2005068216 | A | 3/2005 |
| JP | 2006028391 | A1 | 2/2006 |
| JP | 2011102364 | A | 5/2011 |
| WO | 8200468 | A1 | 2/1982 |
| WO | 2013027165 | A1 | 2/2013 |
| WO | 2013175448 | A1 | 11/2013 |
| WO | 2014036254 | A1 | 3/2014 |
| WO | 2014072923 | A1 | 5/2014 |
| WO | 2016079706 | A1 | 5/2016 |
| WO | 2017037637 | A1 | 3/2017 |
| WO | 2018020425 | A1 | 2/2018 |

OTHER PUBLICATIONS

Park, H. Nathaniel et al.; "Expanding the Cationic Polycarbonate Platform: Attachment of Sulfonium Moieties by Postpolymerization Ring Opening of Epoxides"; ACS Macro Letters, vol. 5, 2016, p. 1247-1252.

R. Thomas; "A Beginner's Guide to ICP-MS: Part VIII-Mass Analyzers: Time-of-Flight Technology"; Spectroscopy 17,36-41 (2002).

International Search Report for International Application No. PCT/US2019/062920, International Filing Date Nov. 25, 2019, dated Feb. 10, 2020, 6 pages.

Written Opinion for International Application No. PCT/US2019/062920, International Filing Date Nov. 25, 2019, dated Feb. 10, 2020, 7 pages.

Non Final Office Action U.S. Appl. No. 16/677,800 filed Nov. 8, 2019; dated May 3, 2021; 29 pages.

Camarda et al. "Optimization in Polymer Design Using Connectivity Indices" Ind. Eng. Chem. Res. 1999, 38, 1884-1892.

Mayo et al. "Dreiding: A Generic Force Field of Molecular Simulations", J. Phsy. Chem. 1990,94, 8897-8909.

Van Breemen et al. "Extending the EGP constitutive model for polymer glasses to multiple relaxation times", Journal of the Mechanics and Physics of Solids 59 (2011) 2191-2207.

Van Ruymbeke et al. "Prediction of linear viscoelastic properties for polydisperse mixtures of entangled star and linear polymers: Modified tube-based model and comparison with experimental results" J. Non-Newtonian Fluid Meeh. 128 (2005) 7-22.

Xu et al. "Prediction of refractive indices of linear polymers by a four-descriptor QSPR model", Polymer 45 (2004) 8651-8659.

* cited by examiner

SULFUR-STABILIZED COPOLYCARBONATES AND ARTICLES FORMED THEREFROM

CROSS REFERENCE TO RELATED APPLICATION

This application claims priority to European Application No. 18209615.6 filed Nov. 30, 2018, the content which is incorporated herein by reference in its entirety.

BACKGROUND

This disclosure relates to stabilized high heat copolycarbonates, compositions containing the high heat copolycarbonates, and articles formed therefrom, such as lenses.

Polycarbonates are useful in the manufacture of articles for a wide range of applications, from automotive parts to electronic appliances to lenses for cell phones and sensors. Because of their broad use, particularly in automotive, lighting, and lens applications, it is desirable to provide polycarbonates that have high clarity (high light transmission), low color, and good processability. This can be difficult to achieve when the monomers used in the manufacture of the polycarbonates have structures that are more susceptible to oxidation, such as monomers that contain tertiary or benzylic hydrogens. It would be a further advantage if the thermoplastic compositions had high heat resistance. There is accordingly remains a need for polycarbonates with improved thermal performance such as high heat deflection temperature, in combination with high clarity, low color, and good processability.

SUMMARY

A copolycarbonate is provided, comprising 0.005-0.1 mole percent of sulfur-containing carbonate units derived from a sulfur-containing bisphenol monomer, 2-95 mole percent of high heat carbonate units derived from a high heat aromatic dihydroxy monomer, and 5-98 mole percent of a low heat carbonate units derived from a low heat aromatic monomer, each based on the sum of the moles of the carbonate units; and optionally, thioether carbonyl endcaps of the formula —C(═O)-L-S—R, wherein L is a $C_{1-12}$ aliphatic or aromatic linking group and R is a $C_{1-20}$ alkyl, $C_{6-18}$ aryl, or $C_{7-24}$ arylalkylene; wherein the sulfur-containing carbonate units are present in an amount effective to provide 5-30, or 5-15, or 5-10 parts per million by weight of sulfur.

A method for the manufacture of the high heat copolycarbonate comprises polymerizing a composition comprising: 0.005-0.1 mole percent of sulfur-containing carbonate units derived from a sulfur-containing bisphenol monomer, 2-95 mole percent of high heat carbonate units derived from a high heat aromatic dihydroxy monomer, 5-98 mole percent of a bisphenol carbonate, preferably bisphenol A, each based on the sum of the moles of the carbonate units; and optionally, a thioether carbonyl endcapping agent of the formula —C(═O)-L-S—R, wherein G is leaving group, L is a $C_{1-12}$ aliphatic or aromatic linking group and R is a $C_{1-20}$ alkyl, $C_{6-18}$ aryl, or $C_{7-24}$ arylalkylene; wherein the sulfur-containing carbonate units are present in an amount effective to provide 5-30, or 5-15, or 5-10 parts per million by weight of sulfur.

Also provided is a thermoplastic composition comprising the high heat copolycarbonate. An article comprising the high heat copolycarbonate or a thermoplastic composition including the high heat copolycarbonate is described. In an aspect, the article can be an optical article such as a lens. In yet another aspect, a metallized article is provided comprising the above-described copolycarbonate. In still another aspect, a method of manufacture of an article comprises molding, extruding, or shaping the above-described copolycarbonate or thermoplastic composition into an article.

The above described and other features are exemplified by the following drawings, detailed description, examples, and claims.

DETAILED DESCRIPTION

Figure 1:
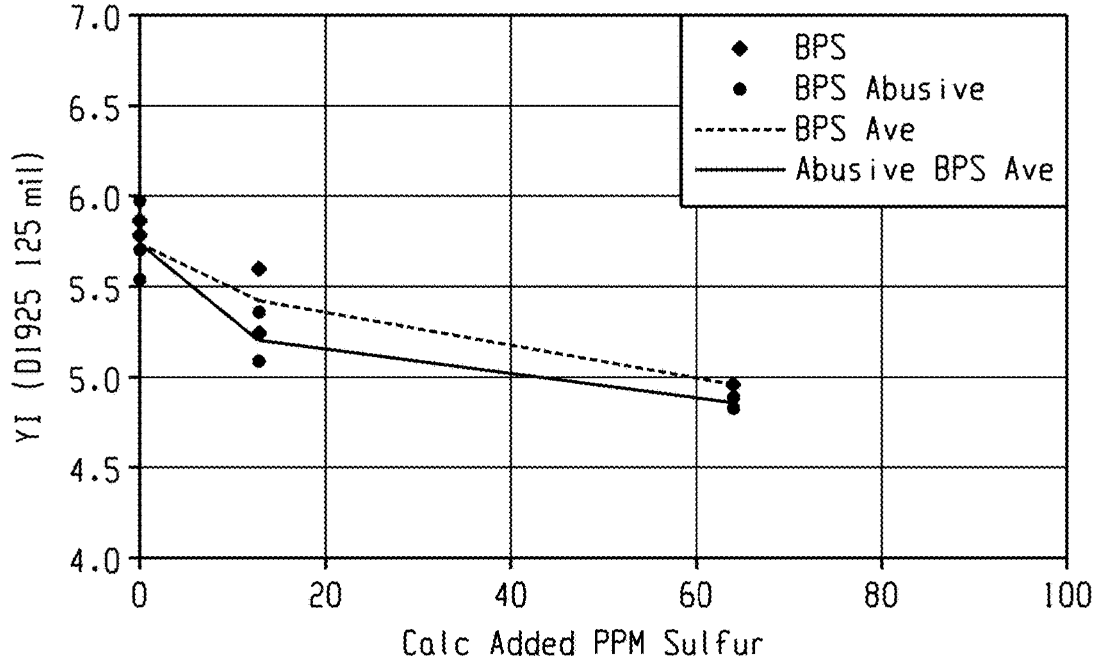
FIG. 1 is a graph of YI values of the compositions of Table 2, showing that YI decreases with increasing sulfur levels from 0-65 ppm with 4,4'-sulfonyldiphenol as the sulfur source.

The inventors hereof have discovered that the presence of a stabilizing, sulfur-containing monomer in high heat copolycarbonates can improve the color stability of the high heat copolycarbonates. This was a surprising result because sulfur impurities produced during monomer synthesis are associated with undesirable color formation in thermoplastic compositions. Surprisingly, thermoplastic compositions with added sulfur from sulfur-containing monomers, endcapping agents, or sulfur-containing stabilizers have improved color stability. The high heat copolycarbonates comprise: stabilizing sulfur-containing bisphenol carbonate units, high heat aromatic carbonate units, and low heat aromatic carbonate units. The total added sulfur content of the high heat copolycarbonate can be 5-100 parts per million by weight (ppm). In some aspects, the high heat copolycarbonates further comprise sulfur-containing endcaps. In other aspects, the high heat copolycarbonates can be combined with a sulfur-containing stabilizer that is soluble in an organic solvent, but of low solubility in an aqueous solvent.

As stated above, the high heat copolycarbonates comprise repeat carbonate units including stabilizing, sulfur-containing bisphenol carbonate units (1), high heat aromatic carbonate units (2), and low heat carbonate units (3).

$$—R^S—O—\overset{\displaystyle O}{\overset{\|}{C}}—O— \qquad (1)$$

$$—R^H—O—\overset{\displaystyle O}{\overset{\|}{C}}—O— \qquad (2)$$

$$—R^L—O—\overset{\displaystyle O}{\overset{\|}{C}}—O— \qquad (3)$$

wherein $R^S$ is derived from the corresponding stabilizing sulfur-containing bisphenol monomer, $R^H$ is derived from the corresponding high heat aromatic dihydroxy monomer, and $R^L$ is derived from the corresponding low heat aromatic dihydroxy monomer. Each of these is described in further detail below.

$R^S$ in formula (1) can be a group of formula (1a), which can be derived from the stabilizing sulfur-containing bisphenol monomer of formula (4)

(1a)

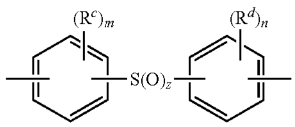

(4)

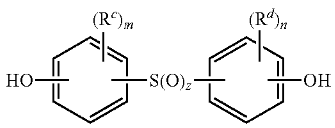

wherein $R^c$ and $R^d$ are each independently a halogen, $C_{1-6}$ alkyl, $C_{1-6}$ alkoxy, or $C_{6-12}$ aryl, m and n are each independently 0-4, and z is 0, 1, or 2. In an aspect, $R^c$ and $R^d$ are each independently a halogen, $C_{1-3}$ alkyl, $C_{1-3}$ alkoxy, phenyl, or phenyloxy and m and n are each 0-2. Alternatively, m and n are each 1 and $R^c$ and $R^d$ are each a methyl, disposed meta to the hydroxy group on each ring. In a preferred aspect, the stabilizing, sulfur-containing bisphenol carbonate units (1) are of formula 1(b), (1c), (1d), or a combination thereof, (1b)

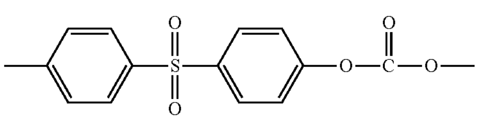

(1c)

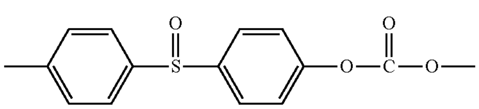

(1d)

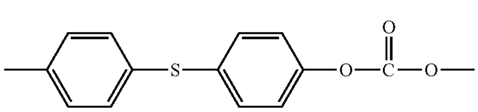

which can be derived from 4,4'-sulfonyldiphenol, 4,4'-sulfinyldiphenol, and 4,4'-thiodiphenol, respectively.

The high heat aromatic carbonate units (2) are derived from the corresponding high heat aromatic dihydroxy monomer. As used herein, a "high heat aromatic dihydroxy monomer" is a compound that can be used to make a polycarbonate homopolymer having a glass transition temperature (Tg) of 175-330° C. determined by differential scanning calorimetry (DSC) as per ASTM D3418 with a 20° C./min heating rate. Such monomers can have 19 or more carbon atoms. Exemplary $R^H$ groups in high heat aromatic carbonate units can be of formulas (2a)-(2g)

(2a)

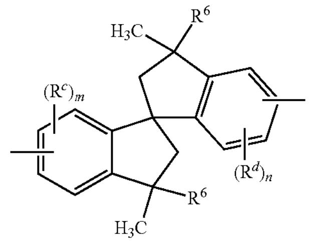

(2b)

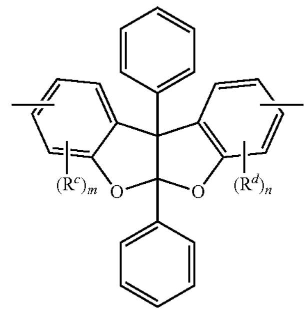

(2c)

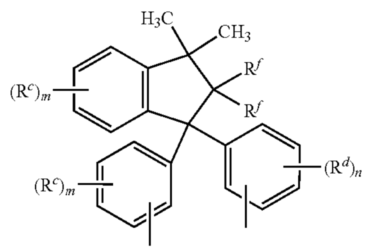

(2d)

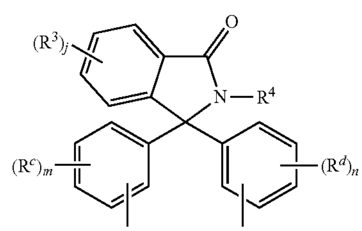

(2e)

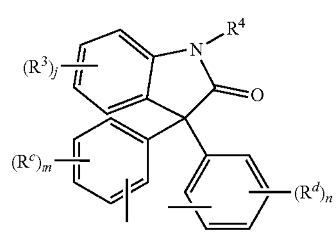

(2f)

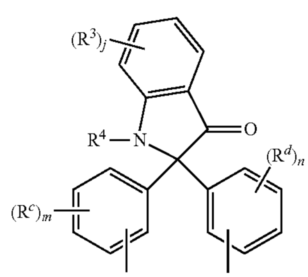

-continued (2g)

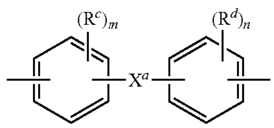

wherein $R^c$ and $R^d$ are each independently a $C_{1-12}$ alkyl, $C_{2-12}$ alkenyl, $C_{3-8}$ cycloalkyl, or $C_{1-12}$ alkoxy, each $R^f$ is hydrogen or both $R^f$ together are a carbonyl group, each $R^3$ is independently $C_{1-6}$ alkyl, $R^4$ is hydrogen, $C_{1-6}$ alkyl, or phenyl optionally substituted with 1-5 $C_{1-6}$ alkyl groups, $R^6$ is independently $C_{1-3}$ alkyl or phenyl, preferably methyl, $X^a$ is a $C_{6-12}$ polycyclic aryl, $C_{3-18}$ mono- or polycycloalkylene, $C_{3-18}$ mono- or polycycloalkylidene, —C($R^h$)($R^g$)— group wherein $R^h$ is hydrogen, $C_{1-12}$ alkyl, or $C_{6-12}$ aryl and $R^g$ is $C_{6-12}$ aryl, or -$(Q^a)_x$-G-$(Q^b)_y$- group wherein $Q^a$ and $Q^b$ are each independently a $C_{1-3}$ alkylene, G is a $C_{3-10}$ cycloalkylene, x is 0 or 1, and y is 1, and j, m, and n are each independently 0-4. A combination of different high heat aromatic groups can be used.

In an aspect, $R^c$ and $R^d$ are each independently a $C_{1-3}$ alky or $C_{1-3}$ alkoxy, each $R^6$ is methyl, each $R^3$ is independently $C_{1-3}$ alkyl, $R^4$ is methyl, or phenyl, each $R^6$ is independently $C_{1-3}$ alkyl, or phenyl, preferably methyl, $X^a$ is a $C_{6-12}$ polycyclic aryl, $C_{3-18}$ mono- or polycycloalkylene, $C_{3-18}$ mono- or polycycloalkylidene, —C($R^h$)($R^g$)— group wherein $R^h$ is $C_{1-3}$ alkyl or $C_{6-12}$ aryl and $R^g$ is $C_{6-12}$ aryl, or $(Q^1)_x$-G-$(Q^2)_y$- group, wherein $Q^1$ and $Q^2$ are each independently a $C_{1-3}$ alkylene and G is a $C_{3-10}$ cycloalkylene, x is 0 or 1, and y is 1, and j, m, and n are each independently 0 or 1.

Specific exemplary high heat aromatic groups $R^H$ include those of formulas (2b-1), (2c-1), (2e-1), and (2g-1) to (2g-11)

(2b-1)

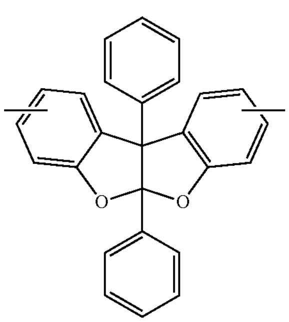

(2c-1)

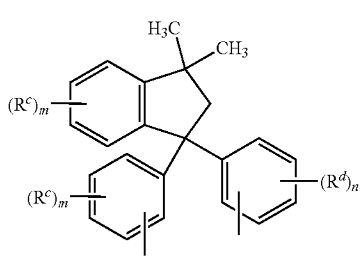

-continued (2e-1)

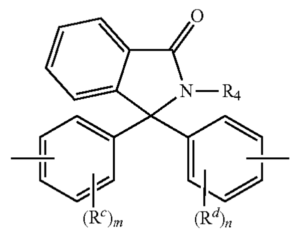

(2g-1)

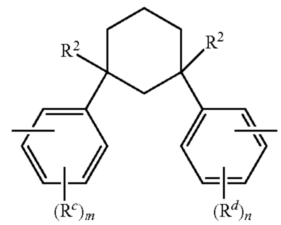

(2g-2)

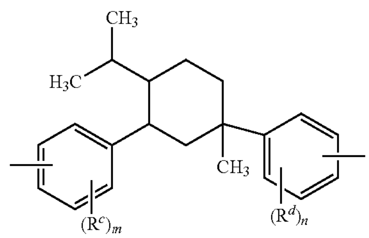

(2g-3)

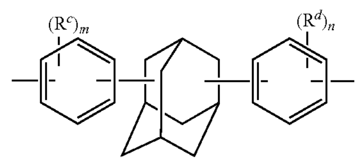

(2g-4)

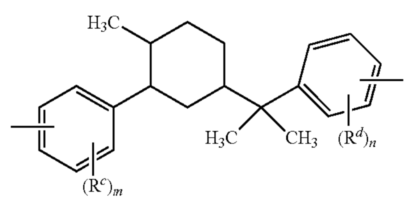

(2g-5)

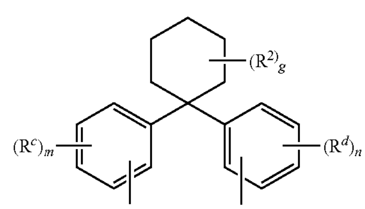

(2g-6)

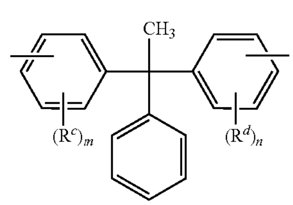

-continued (2g-7)

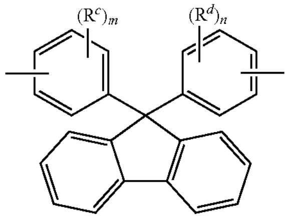

(2g-8)

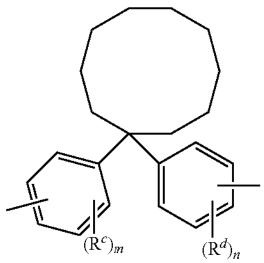

(2g-9)

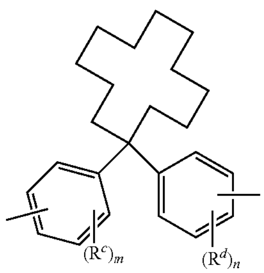

(2g-10)

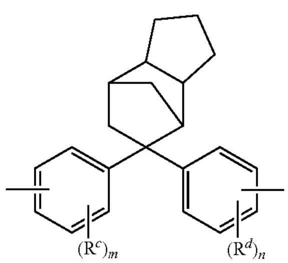

(2g-11)

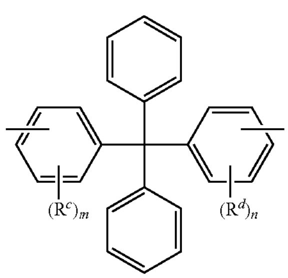

wherein $R^c$ and $R^d$ are the same as defined for formulas (2a)-(2g), each $R^2$ is independently hydrogen or $C_{1-4}$ alkyl, m and n are each independently 0-4, each $R^3$ is independently $C_{1-4}$ alkyl or hydrogen, $R^4$ is $C_{1-6}$ alkyl or phenyl optionally substituted with 1-5 $C_{1-6}$ alkyl groups, and g is 0-10. In a specific aspect each bond of the divalent group is located para to the linking group that is $X^a$, and $R^c$ and $R^d$ are each independently a $C_{1-3}$ alkyl, or $C_{1-3}$ alkoxy, each $R^2$ is methyl, x is 0 or 1, y is 1, and m and n are each independently 0 or 1.

The high heat aromatic group is preferably of the formulas (2b-1a)

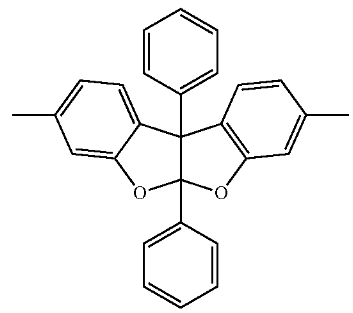

(2c-1a)

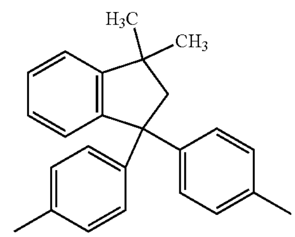

(2e-1a)

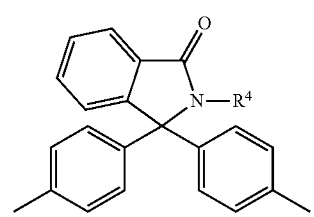

(2g-5a)

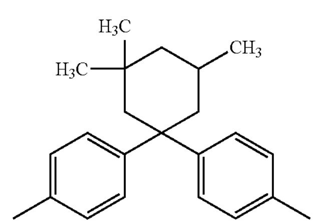

(2g-6a)

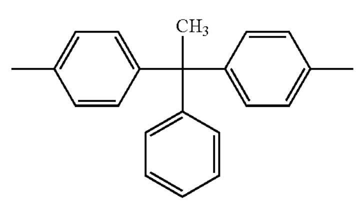

(2g-7a)

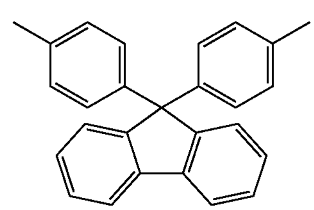

-continued (2g-9a)

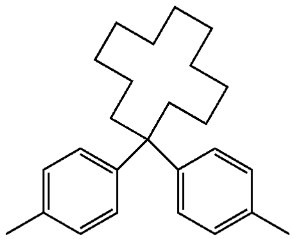

wherein $R^4$ is methyl or phenyl.

Preferably, the high heat aromatic group is derived from the corresponding bisphenol, in particular from 3,8-dihydroxy-5a,10b-diphenyl-coumarano-2',3',2,3-coumarane (corresponding to structure 2b-1a), 4,4'-(3,3-dimethyl-2,2-dihydro-1H-indene-1,1-diyl)diphenol (corresponding to structure 2c-1a), 2-phenyl-3,3'-bis(4-hydroxyphenyl) phthalimidine (PPPBP) (corresponding to structure 2e-1a), 1,1-bis(4-hydroxyphenyl)-3,3,5-trimethyl-cyclohexane (BPI) (corresponding to structure 2g-5a), 4,4'-(1-phenylethylidene)bisphenol (corresponding to structure 2g-6a), 9,9-bis(4-hydroxyphenyl)fluorene (corresponding to structure (2g-7a), 1,1-bis(4-hydroxyphenyl)cyclododecane (corresponding to structure 2g-9a), or a combination thereof. In an aspect, the high heat aromatic group is derived from BPI.

The low heat aromatic carbonate units (3) are derived from the corresponding low heat aromatic dihydroxy monomer. As used herein, a "low heat aromatic dihydroxy monomer" means a compound that can be used to manufacture a polycarbonate homopolymer having a Tg of less than 170° C., for example 120-160° C., each as determined by differential scanning calorimetry (DSC) as per ASTM D3418 with a 20° C./min heating rate. Such monomers generally have 18 or fewer carbon atoms. Exemplary $R^L$ groups in low heat aromatic carbonate units (3) can be of formula (3a)

(3a)

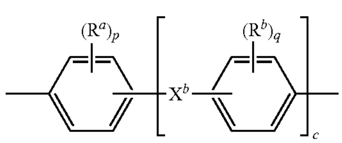

wherein $R^a$ and $R^b$ are each independently a halogen, $C_{1-3}$ alkoxy, or $C_{1-3}$ alkyl, c is 0-4, and p and q are each independently integers of 0 or 1. In an embodiment, p and q are each 0, or p and q are each 1 and $R^a$ and $R^b$ are each a methyl, disposed meta to the hydroxy group on each arylene group. $X^b$ in formula (3a) is a bridging group connecting the two hydroxy-substituted aromatic groups, where the bridging group and the hydroxy substituent of each $C_6$ arylene group are disposed ortho, meta, or para (preferably para) to each other on the $C_6$ arylene group. $X^b$ can be, for example, a single bond, —O—, —C(O)—, or a $C_{1-6}$ organic group, which can be cyclic or acyclic, aromatic or non-aromatic, and can further comprise heteroatoms such as halogens, oxygen, nitrogen, sulfur, silicon, or phosphorous. For example, $X^b$ can be a $C_{3-6}$ cycloalkylidene, a $C_{1-6}$ alkylidene of the formula —C($R^c$)($R^d$)— wherein $R^c$ and $R^d$ are each independently hydrogen, $C_{1-5}$ alkyl, or a group of the formula —C(=$R^e$)— wherein $R^e$ is a divalent $C_{1-5}$ hydrocarbon group. Some illustrative examples of dihydroxy compounds that can be used are described, for example, in WO 2013/175448 A1, US 2014/0295363, and WO 2014/072923.

In an aspect, the low heat aromatic group is of formula (3b)

(3b)

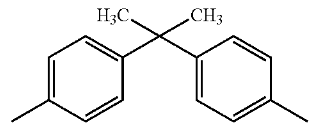

which can be derived from 2,2-is (4-hydroxyphenyl)propane, also known as bisphenol A (BPA).

The high heat copolycarbonates can comprise 0.005-0.1 mole percent (mol %) of the stabilizing, sulfur-containing bisphenol carbonate units (1), 2-95 mol % of the high heat aromatic carbonate units (2), and 5-98 mol % of the low heat carbonate units (3), preferably bisphenol A carbonate units. Preferably, the high heat carbonate units are derived from BPI, PPPBP, or a combination thereof. If a combination of two high heat aromatic monomers is used, such as BPI and PPPBP, the high heat copolycarbonate can have 5-95 mol % of a first high heat aromatic carbonate units and 5-95 mol % of a second high heat aromatic carbonate units, or 20-80 mol % of the first high heat aromatic carbonate units and 20-80 mol % of the second high heat aromatic carbonate units, or 30-70 mol % of the first high heat aromatic carbonate units and 30-70 mol % of the second high heat aromatic carbonate units, each based on the total number of carbonate units in the high heat copolycarbonates.

In another aspect, the high heat copolycarbonates can comprise 0.005-0.1 mol % of the stabilizing, sulfur-containing bisphenol carbonate units (1), 20-90 mol % of the high heat aromatic carbonate units (2), and 10-80 mol % of the low heat carbonate units (3), preferably bisphenol A carbonate unit. Preferably, the high heat carbonate units are derived from BPI, PPPBP, or a combination thereof. If a combination of two high heat aromatic monomers is used, such as BPI and PPPBP, the high heat copolycarbonate can have 5-95 mol % of the first high heat aromatic carbonate units and 5-95 mol % of the second high heat aromatic carbonate units, or 20-80 mol % of the first high heat aromatic carbonate units and 20-80 mol % of the second high heat aromatic carbonate units, or 30-70 mol % of the first high heat aromatic carbonate units and 30-70 mol % of the second high heat aromatic carbonate units, each based on the total number of carbonate units in the high heat copolycarbonates.

In another aspect, the high heat copolycarbonate comprises: 0.005-0.1 mol % of the stabilizing, sulfur-containing carbonate units (1), 30-80 mol % of the high heat aromatic carbonate units (2), and 20-70 mol % of bisphenol A carbonate units (3). Preferably, the high heat carbonate units are derived from BPI, PPPBP, or a combination thereof. If a combination of two high heat aromatic monomers is used, such as BPI and PPPBP, the high heat copolycarbonate can have 5-95 mol % of the first high heat aromatic carbonate units and 5-95 mol % of the second high heat aromatic carbonate units, or 20-80 mol % of the first high heat aromatic carbonate units and 20-80 mol % of the second high heat aromatic carbonate units, or 30-70 mol % of the first high heat aromatic carbonate units and 30-70 mol % of the second high heat aromatic carbonate units, each based on the total number of carbonate units in the high heat copolycarbonates.

The high heat copolycarbonate can be prepared from substantially pure monomers. The low heat aromatic dihydroxy monomer, the high heat aromatic dihydroxy monomer, and the sulfur-containing bisphenol monomer each can have a purity of at least 99.6%, at least 99.7%, or at least 99.8% as determined by high performance liquid chromatography (HPLC). In an aspect, the high heat aromatic dihydroxy monomer can have a purity of 99.8% of greater. In an aspect, the low heat aromatic dihydroxy monomer can have a purity of 99.8% or greater. In an aspect, the sulfur-containing bisphenol monomer can have a purity of 99.8% or greater. In a preferred aspect, the high heat aromatic dihydroxy monomer, the low heat aromatic dihydroxy monomer, and the sulfur-containing bisphenol monomer each can have a purity of 99.8% or greater.

In contrast to the teachings of the prior art, the inventors have found that copolycarbonate compositions containing sulfur can have improved properties such as transparency, provided that the source of the sulfur is present in the monomers, endcapping agents, or various stabilizing compounds that contain sulfur as described herein. This sulfur is referred to herein as "added sulfur" and excludes any sulfur present in the components used in the manufacture of the copolycarbonates, i.e., the high heat aromatic dihydroxy monomer, the low heat aromatic dihydroxy monomer and the carbonate source, for example. Nonetheless, it can be advantageous to minimize or eliminate sulfur from these sources. Accordingly, in an aspect the high heat aromatic dihydroxy monomer and the low heat aromatic dihydroxy monomer each have a sulfur content of less than 5 ppm. In another aspect, the low heat aromatic dihydroxy monomer and the high heat aromatic dihydroxy monomer each have a purity of at least 99.6%, at least 99.7%, or at least 99.8% as determined by HPLC and a sulfur content of less than 5 ppm. In a preferred aspect, the low heat aromatic dihydroxy monomer and the high heat aromatic dihydroxy monomer each have a purity of at least 99.8% and a sulfur content of less than 5 ppm.

The high heat copolycarbonates can be manufactured by processes such as interfacial polymerization and melt polymerization, which are known, and are described for example in WO 2013/175448 A1 and WO 2014/072923 A1. An endcapping agent (also referred to as a chain stopper agent or chain terminating agent) can be included during polymerization to provide end groups, for example monocyclic phenols such as phenol, p-cyanophenol, and $C_{1-22}$ alkyl-substituted phenols such as p-cumyl-phenol, resorcinol monobenzoate, and p- and tertiary-butyl phenol, monoethers of diphenols, such as p-methoxyphenol, monoesters of diphenols such as resorcinol monobenzoate, functionalized chlorides of aliphatic monocarboxylic acids such as acryloyl chloride and methacryoyl chloride, and mono-chloroformates such as phenyl chloroformate, alkyl-substituted phenyl chloroformates, p-cumyl phenyl chloroformate, and toluene chloroformate. Combinations of different end groups can be used. When an endcapping agent is present, the high heat copolycarbonates can comprise a free hydroxyl level less than or equal to 250 parts per million by weight (ppm), or less than or equal to 200 ppm, or less than or equal to 150 ppm.

Branched polycarbonate blocks can be prepared by adding a branching agent during polymerization, for example trimellitic acid, trimellitic anhydride, trimellitic trichloride, tris-p-hydroxyphenylethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha, alpha-dimethyl benzyl)phenol), 4-chloroformyl phthalic anhydride, trimesic acid, and benzophenone tetracarboxylic acid. The branching agents can be added at a level of 0.05-2.0 wt %. Combinations of linear polycarbonates and branched polycarbonates can be used.

During manufacture of the high heat copolycarbonates, the sulfur-containing monomer can be added in an amount of less than 200 ppm, for example 0.1-200 ppm, or 0.1-150 ppm, or 1-100 ppm, or 1-75 ppm, or 1-40 ppm, based on the total parts by weight of the high heat aromatic dihydroxy monomer and the low heat aromatic dihydroxy monomer used.

In an aspect, the amount of the sulfur-containing monomer used can be that amount effective for the sulfur-containing carbonate units to provide 5-30 ppm, 5-15 ppm, or 5-10 ppm of monomer-added sulfur, in the high heat copolycarbonates, each based on the total parts by weight of the high heat copolycarbonates. As stated above, "added sulfur" (here, "monomer-added sulfur" refers to sulfur added to the copolycarbonate from the sulfur-containing monomer and does not include any sulfur present in the high heat aromatic dihydroxy monomer, the low heat aromatic dihydroxy monomer, or the carbonate source used in manufacture of the high heat copolycarbonates.

The sulfur content of the high heat copolycarbonates can be measured by several methods. A commercially available Total Sulfur Analysis based on combustion and coulometric detection (fluorescence/chemiluminescence) can be used for samples that do not contain high levels of nitrogen. In the use of fluorescence/chemiluminescence detection of sulfur, interference of high concentrations of nitrogen concentrations becomes significant when analyzing sulfur at trace level. During combustion, the nitrogen present in the sample is converted into nitric oxide molecules (NO). During the absorption and excitation stage of the sulfur analyzer with UV-Fluorescence detection, NO-molecules interferes by emitting light at the same wavelength as SO2. Therefore, in samples with nitrogen content, it is advisable to use a different technique which is free of these interferences. In such cases, inductively coupled plasma mass spectrometry (ICP-MS) can be used. However, this technique can also be affected by interferences. For sulfur, the mass-to-charge ratios (m/z) of its main isotopes (32S+ and 34S+) overlap with polyatomic ions such as 16O2+, (16OH)2+, 16O18O+, and 14N18O+, which can affect sensitivity and accuracy of the measurement (L. L. Yu, W. R. Kelly, J. D. Fassett, and R. D. Vocke, *J. Anal. At. Spectrum.* 16, 140-145 (2001)). However, this can be overcome by introducing $O_2$ in a pressurized reaction cell and monitoring SO+ rather than S+. Thus, the analytical signal is recorded in an m/z region with less intense interfering signals (R. Thomas, *Spectroscopy* 17, 42-48 (2002); D. R. Bandura, V. I. Baranov, and S. D. Tanner, *Anal. Chem.* 74, 1497-1502 (2002)). Lastly, a nitrogen-containing sample can be analyzed using a Triple Quadrupole ICP-MS (ICP-QQQ) which eliminates such interferences.

The high heat copolycarbonates can be essentially free of certain ions or low molecular weight molecules (less than 150 Daltons (Da)) that can be present in the starting materials or that can arise from manufacture of the copolymers. For example, the high heat copolycarbonates can comprise less than 5 ppm, or less than 2 ppm of each chloride, sodium, calcium, iron, nickel, copper, and zinc ions as residual impurities. In another aspect, the high heat copolycarbonates have a very low residual impurity content, in particular less than 2 ppm of each of triethyl amine, calcium ions, magnesium ions, potassium ions, iron ions, and chloride ions. In another aspect, the high heat copolycarbonates have a low residual impurity content, in particular less than 5 ppm by weight, or less than 2 ppm by weight of each of lithium, sodium, potassium, calcium, magnesium, ammonium, chloride, bromide, fluoride, nitrite, nitrate, phosphite, phosphate, sulfate, acetate, citrate, oxalate, trimethylammonium, and triethylammonium. It is to be understood that the foregoing residual impurities can exist in the high heat copolycarbonates or polycarbonate compositions in un-ionized form (for example as triethylamine or formic acid), but are determined based on their ionized form.

The residual impurity content can be determined by methods known in the art, for example those described in US 2016/0237210 and U.S. Pat. No. 9,287,471 using ion chromatography. For example, determination can be accomplished via ion exchange, of a sample obtained by dissolving 2.4 gram of copolycarbonate in 20 mL of dichloromethane and extracting with 10 mL of distilled, deionized water for 1 hour. The water layer is analyzed by ion chromatography with respect to the desired anions, cations, and amines, in particular fluoride, acetate, formate, chloride, nitrite, bromide, nitrate, phosphite, sulphate, oxalate, phosphate, citrate, lithium, sodium, potassium, ammonium, magnesium, calcium, and diethylamine and triethylamine. In another aspect of quantitative analysis of ions, the sample can be submerged in de-ionized water kept at 55° C. for 24 hours, the anions released into the water then analyzed via ion chromatography, e.g., with a Dionex DX500 Ion Chromatograph. Alternatively, quantitative analysis of metals and other compounds can be carried out by conventional inductively coupled plasma emission spectroscopy (ICP) methods to determine the presence of each constituent to the parts per billion (ppb) levels.

The high heat copolycarbonates can have a Tg of 200-260° C., or 210-260° C., or 220-260° C., each determined by DSC as per ASTM D3418 with a 20° C./min heating rate. In general, lower amounts of the low heat polycarbonate units provide copolycarbonates having higher Tgs.

The high heat copolycarbonates in some aspects can have a weight average molecular weight (Mw) of 10,000-50,000 Da, or 16,000-30,000 Da, as measured by gel permeation chromatography (GPC), using a crosslinked styrene-divinylbenzene column and calibrated to BPA homopolycarbonate references. GPC samples can be prepared at a concentration of 1 mg per ml and eluted at a flow rate of 1.5 ml per minute.

In some aspects a sulfur-containing endcapping agent can be present during manufacture of the high heat copolycarbonate, in particular those including $C_{6-14}$ alkyl substituents, which can provide improved mold release properties. The sulfur-containing endcapping agent can be a thioether carbonyl compound of formula (A)

(A)

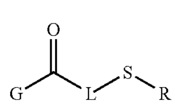

wherein G is leaving group, L is a $C_{1-12}$ aliphatic or aromatic linking group, and R is a $C_{1-20}$ alkyl, $C_{6-18}$ aryl, or $C_{7-24}$ alkylarylene, preferably a $C_{1-14}$ alkyl, $C_{6-12}$ aryl, or a $C_{7-13}$ arylalkylene. Preferably R is a $C_{6-14}$ alkyl. For example, G can be a halide, a hydroxy group (—OH), or a salt of a hydroxy group. For example, the salt can be an alkali metal or alkaline-earth metal salt, an ammonium salt, or the like.

In another aspect, G of formula (A) can be of the formula —$OR^a$ and the thioether carbonyl compound can be of formula (A1)

(A1)

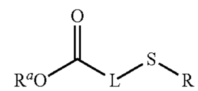

wherein $R^a$ is a $C_{1-3}$ alkyl, $C_{6-18}$ aryl, $C_{7-24}$ alkylarylene, or $C_{7-24}$ arylalkylene, and L and R are as defined in formula (A). Preferably $R^a$ is $C_{1-3}$ alkyl, and R is a $C_{6-14}$ alkyl.

The endcapping agent can be a thioether carbonyl compound of formula (A2), or (A3), or a combination thereof (A2)

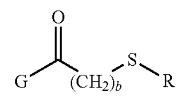

(A3)

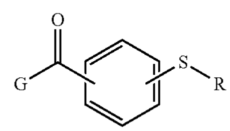

wherein R is a $C_{1-20}$ alkyl, $C_{6-18}$ aryl, or $C_{7-24}$ arylalkylene, preferably a $C_{1-14}$ alkyl, $C_{6-12}$ aryl, or a $C_{7-13}$ arylalkylene, b is 1-5, preferably 1-2, and G is as defined in formula (A). In an aspect R is $C_{6-14}$ alkyl, b is 1-5, preferably 1-2, and G is hydrogen or $R^a$ as defined in formula A1, preferably $C_{1-3}$ alkyl.

For example, the endcapping agent can be a thioether carbonyl compound of formulas (B1) to (B5)

(B1)

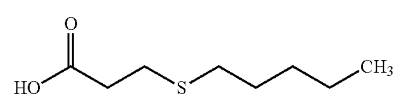

(B2)

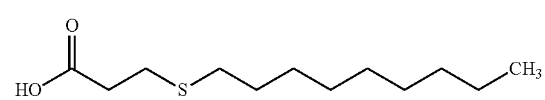

(B3)

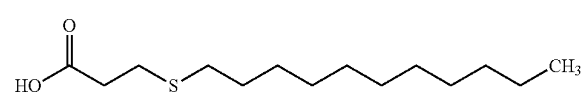

(B4)

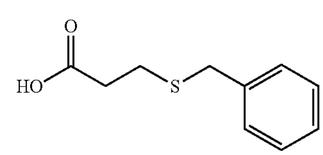

(B5)

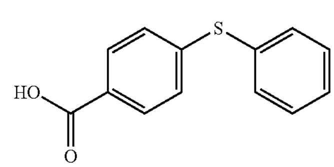

or a combination thereof.

When the sulfur-containing endcaps are used, the copolycarbonates accordingly comprise thioether carbonyl endcaps of the formula —C(═O)-L-S—R, wherein L is a $C_{1-12}$ aliphatic or aromatic linking group and R is a $C_{1-20}$ alkyl, $C_{6-18}$ aryl, or $C_{7-24}$ arylalkylene. The endcaps can be of the formula

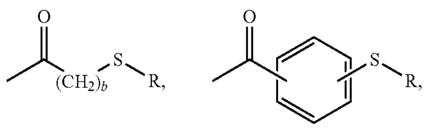

or a combination thereof, wherein R is a $C_{1-20}$ alkyl, $C_{6-18}$ aryl, or $C_{7-24}$ arylalkylene, preferably a $C_{1-14}$ alkyl, $C_{6-12}$ aryl, or a $C_{7-13}$ arylalkylene, and b is 1-5, preferably 1-2. In another preferred aspect, the thioether carbonyl endcaps are of the formula

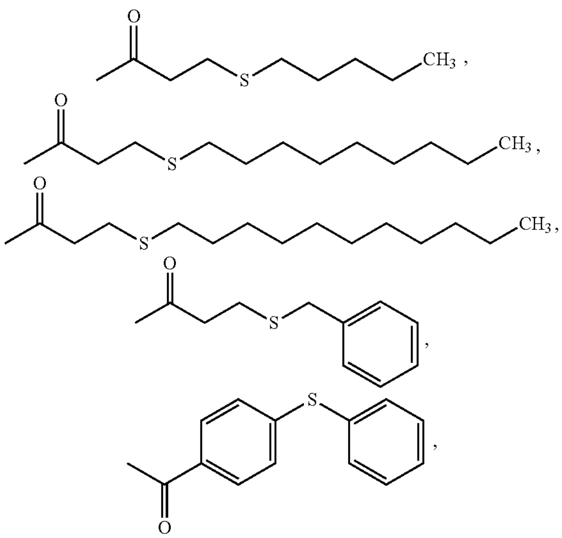

or a combination thereof.

The sulfur-containing endcapping agent can be used alone or in combination with other endcapping agents. More than one sulfur-containing endcapping agent can be used, such as 2, 3, or 4 or more different sulfur-containing endcapping agents. The high heat copolycarbonates with the sulfur-containing endcaps can have properties (e.g., Mw, contaminants) similar to the high heat copolycarbonates without the sulfur-containing endcaps.

When the sulfur-containing endcaps are present, the amount of the sulfur-containing endcapping agent used can be that amount effective for the sulfur-containing endcaps to provide 3-80 ppm, or 5-70 ppm, preferably 5-50 ppm, more preferably 10-50 ppm of added sulfur, i.e., endcap-added sulfur, in the high heat copolycarbonates, each based on the total parts by weight of the high heat copolycarbonate. When sulfur-containing endcaps are present, a lower amount of the sulfur-containing monomer(s) can be used to obtain the desired total added sulfur content. The total added sulfur content (the added sulfur from both the sulfur-containing monomers and the endcaps) can be 5-100 ppm, or 10-50 ppm, or 10-25 ppm, or 10-20 ppm.

Also disclosed herein are thermoplastic compositions comprising the high heat copolycarbonates. The thermoplastic compositions can have 10-100 wt %, or 20-80 wt %, or 40-70 wt %, or 85-99.8 wt % of the high heat copolycarbonates, each based on the total weight of the polymers in the thermoplastic compositions. In some aspects, no additional polymer is present in the thermoplastic compositions. In other aspects, the thermoplastic compositions can comprise an additional polymer different from the high heat copolycarbonates, for example a polycarbonate such as a BPA homopolycarbonate. When an additional polycarbonate is present, it can be, for example in an amount less than 15 wt % of a BPA homopolycarbonate, based on the total weight of the polymers in the thermoplastic composition. The BPA homopolycarbonate can be derived from a BPA monomer having a purity less than 99.7% determined by HPLC. Alternatively, the BPA homopolycarbonate can be derived from a high purity BPA monomer having a purity equal to or greater than 99.7% determined by HPLC. The BPA homopolycarbonate can be a linear BPA homopolycarbonate having an Mw of 10,000-100,000 Da, or 15,000-50,000 Da, or 17,000-35,000 Da, as measured by GPC, using a crosslinked styrene-divinylbenzene column and calibrated to BPA homopolycarbonate references. GPC samples can be prepared at a concentration of 1 mg per ml and eluted at a flow rate of 1.5 ml per minute. More than one BPA homopolycarbonate can be present. For example, the thermoplastic compositions can comprise a first BPA homopolycarbonate having an Mw of 20,000-25,000 Da and a second BPA homopolycarbonate having an Mw of 28,000-32,000 Da, or a second BPA homopolycarbonate having an Mw of 16,000-20,000 Da, each measured by GPC using BPA homopolycarbonate standards. The weight ratio of the first BPA homopolycarbonate relative to the second BPA homopolycarbonate can be 10:1-1:10, or 5:1-1:5, or 3:1-1:3 or 2:1-1:2.

In an aspect, the BPA purity of the thermoplastic composition is equal to or greater than 99.6% or equal or greater than 99.7%, or preferably greater than 99.8% as measured using HPLC. As used herein, the "BPA purity" refers to the overall purity of the BPA monomer used to prepare the high heat copolycarbonate and the BPA homopolycarbonate, if present. The BPA purity of a polycarbonate composition can be determined by a mild depolymerization followed by a HPLC analysis. For example, about 200 milligrams (mg) of the polycarbonate composition is dissolved in 5 milliliters (mL) of tetrahydrofuran (THF) and 2 ml of a 10% solution of potassium hydroxide diluted in methanol. The depolymerization of polycarbonate is carried out with the use of these solvents. The solution is shaken for 2 hours. Then, 2 mL of acetic acid are added to protonate the BPA carbonate salts and decrease the pH. The solution is shaken again for half an hour for homogenization and dissolution of all precipitates. The sample is analyzed by HPLC. The wt % of BPA impurities in the polycarbonate composition can be calculated by Equation 1:

$$\text{wt \% of impurities in } BPA = \frac{\text{wt \% of impurities} * 254}{228}. \quad \text{(Equation 1)}$$

In Equation 1, wt % of impurities refer to the impurities measured by HPLC after depolymerization. Because the BPA molar mass is different from the carbonated BPA, the wt % of impurities is multiplied by 254 Da and divided by Da. An amount of 254 Da and 228 Da correspond to the BPA carbonate the BPA molar mass, respectively. In some aspects, it can be advantageous to use copolycarbonates and the optional BPA homopolycarbonates with very low residual contents of volatile impurities. For example, the polymer components can have a content of chlorobenzene and other aromatic chlorine compounds of less than 10 ppm, or less than 5 ppm, or less than 2 ppm, dichloromethane of less than 1 ppm, or less than 0.5 ppm, monohydric phenols such as phenol, tert-butylphenol and cumylphenol of less than 15 ppm, or less than 5 ppm, or less than 2 ppm, and alkanes of less than 10 ppm, or less than 5 ppm. In other aspects, the high heat copolycarbonates and the optional BPA homopolycarbonates can have residual contents of: carbon tetrachloride of less than 0.01 ppm, diaryl carbonates, in particular diphenyl carbonate and di-tert-butyl phenolcarbonate, of less than 5 ppm, or less than 2 ppm, BPA and other bisphenols of less than 5 ppm, or less than 2 ppm, or less than 0.5 ppm, sodium and other alkali metals and alkaline earth metals of less than 0.05 ppm, cresols of less than 1 ppm, or less than 0.2 ppm, phenolic OH groups of less than 300 ppm, or less than 200 ppm, or less than 100 ppm, alkaline earth metals of less than 0.1 ppm, or less than 0.05 ppm, pyridine of less than 1 ppm, or less than 0.1 ppm, nonhalogenated aromatic compounds such as xylene and toluene of less than 10 ppm, or less than 5 ppm. Methods for obtaining and measuring these amounts are described, for example, in US2012/0157653.

The thermoplastic composition including the high heat copolycarbonates can include a sulfur-containing stabilizer compound. In some aspects, the sulfur-containing stabilizer compound comprises a saturated or unsaturated $C_{6-40}$ hydrocarbon chain, or a saturated or unsaturated, branched or unbranched $C_{10-30}$ hydrocarbon chain. Unsaturated hydrocarbon chains can include 1 or more degrees of unsaturation (alkene or alkyne), for example 1, 2, 3, or 4 degrees of unsaturation. The hydrocarbon chain preferably is unbranched. Preferably the $C_{6-40}$ hydrocarbon chain or $C_{10-30}$ hydrocarbon chain is a linear alkyl group.

The sulfur-containing stabilizer compound can include a thioether carboxy compound of formula (5)

(5)

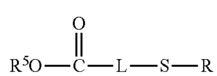

wherein L is a $C_{1-12}$ aliphatic or aromatic linking group; R is a $C_{1-40}$ alkyl, $C_{1-40}$ alkenyl, $C_{1-40}$ alkynyl, $C_{3-40}$ cycloalkyl, $C_{3-40}$ cycloalkenyl, $C_{6-40}$ aryl, $C_{7-40}$ arylalkylene, or $C_{7-40}$ alkylarylene; and $R^5$ is a hydrogen, $C_{1-40}$ alkyl, $C_{6-40}$ aryl, $C_{7-40}$ alkylarylene, or $C_{7-40}$ arylalkylene. In an aspect, L is a $C_{1-6}$ aliphatic or $C_6$ aromatic linking group; R is a $C_{1-30}$ alkyl, $C_{1-30}$ alkenyl, $C_{1-30}$ alkynyl, $C_{6-30}$ aryl, $C_{7-30}$ arylalkylene, or $C_{7-14}$ alkylarylene, and $R^a$ is hydrogen, $C_{1-30}$ alkyl, $C_{6-30}$ aryl, $C_{7-30}$ alkylarylene, or a $C_{7-30}$ arylalkylene. In a preferred aspect, L is a $C_{1-4}$ alkylene or $C_{6-12}$ arylene; R is $C_{1-30}$ alkyl; and $R^a$ is $C_{1-30}$ alkyl.

In some aspects, at least one of the R and $R^5$ groups of the sulfur-containing stabilizer of formula (5) is a saturated or unsaturated, branched or unbranched $C_{6-40}$ hydrocarbon chain, or a saturated or unsaturated, branched or unbranched $C_{10-30}$ hydrocarbon chain as described above. The hydrocarbon chain preferably is unbranched. Preferably at least one of the R and $R^a$ groups of formula (4) is a linear $C_{6-40}$ or $C_{10-30}$ alkyl group. In this aspect the other of the R or $R^a$ groups can be $C_{1-12}$ alkyl, $C_{1-12}$ alkenyl, $C_{1-12}$ alkynyl, $C_{6-12}$ aryl, $C_{7-13}$ arylalkylene, or $C_{7-13}$ alkylarylene. Alternatively in this aspect, the other of the R or $R^a$ groups can be $C_{1-6}$ alkyl, $C_{1-6}$ alkenyl, $C_{6-12}$ aryl, $C_{7-13}$ arylalkylene, or $C_{7-13}$ alkylarylene.

The sulfur-containing stabilizer compound can include a thioether carboxy compound of formula (5a)

(5a)

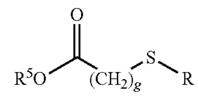

wherein $R^5$ is a hydrogen, $C_{1-40}$ alkyl, $C_{1-40}$ alkenyl, $C_{1-40}$ alkynyl, $C_{3-40}$ cycloalkyl, $C_{3-40}$ cycloalkenyl, $C_{1-40}$ aryl, $C_{7-40}$ arylalkylene, or $C_{7-40}$ alkylarylene, and each g is independently the same or different and is 1-40, provided that $R^5$ has 6-40 or 10-30 carbon atoms or g is 6-40 or 10-30. In an aspect, each $R^5$ a $C_{6-40}$ alkyl, $C_{6-40}$ alkenyl, or $C_{6-40}$ alkynyl, and each g is independently the same or different and is 1-6. In a preferred aspect, $R^5$ is a linear $C_{6-40}$ or $C_{10-30}$ alkyl group and g is 1-6, or 1, 2, or 4.

In other aspects, the sulfur-containing stabilizer compound can be a thioether dicarboxy compound formula (6)

(6)

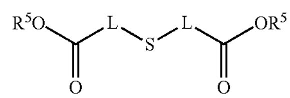

wherein each $R^5$ is independently the same or different and is a hydrogen, $C_{1-40}$ alkyl, $C_{1-40}$ alkenyl, $C_{1-40}$ alkynyl, $C_{3-40}$ cycloalkyl, $C_{3-40}$ cycloalkenyl, $C_{1-40}$ aryl, $C_{7-40}$ arylalkylene, or $C_{7-40}$ alkylarylene; and each L is independently the same or different and is a $C_{1-12}$ aliphatic or aromatic linking group. In an aspect, each $R^5$ is independently the same or different and is a $C_{1-30}$ alkyl, $C_{1-30}$ alkenyl, $C_{1-30}$ alkynyl, $C_{6-30}$ aryl, $C_{7-30}$ arylalkylene, or $C_{7-14}$ alkylarylene, and each L is independently the same or different and is a $C_{1-6}$ aliphatic or $C_6$ aromatic linking group.

In some aspects, at least one of the $R^5$ groups of formula (6) is a saturated or unsaturated, branched or unbranched $C_{6-40}$ hydrocarbon chain, or a saturated or unsaturated, branched or unbranched $C_{10-30}$ hydrocarbon chain as described above. The hydrocarbon chain preferably is unbranched. Preferably at least one, or both, of the $R^5$ groups of formula (5) is a linear $C_{6-40}$ or $C_{10-30}$ alkyl group. In this aspect the other of the $R^5$ groups can be $C_{1-12}$ alkyl, $C_{1-12}$ alkenyl, $C_{1-12}$ alkynyl, $C_{6-12}$ aryl, $C_{7-13}$ arylalkylene, or $C_{7-13}$ alkylarylene. Alternatively in this aspect, the other of the $R^5$ groups can be $C_{1-6}$ alkyl, $C_{1-6}$ alkenyl, $C_{6-12}$ aryl, $C_{7-13}$ arylalkylene, or $C_{7-13}$ alkylarylene.

In a preferred aspect the sulfur-containing stabilizer compound can be a thioether dicarboxy compound formula (6a)

(6a)

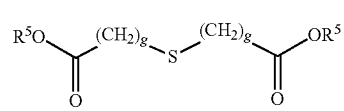

wherein each $R^5$ is independently the same or different and is a hydrogen, $C_{1-40}$ alkyl, $C_{1-40}$ alkenyl, $C_{1-40}$ alkynyl, $C_{3-40}$ cycloalkyl, $C_{3-40}$ cycloalkenyl, $C_{1-40}$ aryl, $C_{7-40}$ arylalkylene, or $C_{7-40}$ alkylarylene, and each g is independently the same or different and is 1-40, provided that at least one $R^5$ has 6-40 or 10-30 carbon atoms or at least one g is 6-40 or 10-30. In an aspect, each $R^5$ is independently the same or different and is a $C_{6-40}$ alkyl, $C_{6-40}$ alkenyl, or $C_{6-40}$ alkynyl, and each g is independently the same or different and is 1-6. In a preferred aspect, each $R^5$ is the same, and is a linear $C_{6-40}$ or $C_{10-30}$ alkyl group and each g is the same and is 1-6, or 1, 2, or 4. Preferred sulfur-containing stabilizers of this type include dilauryl thiodipropionate, dicetyl thiodipropionate, dimyristyl thiodipropionate, distearyl thiodipropionate, and ditridecyl thiodipropionate, or a combination thereof.

In another aspect, the sulfur-containing stabilizer compound can be a thioether ester compound of formula (7)

$$\left[R^5—S—L—\overset{\displaystyle O}{\overset{\|}{C}}—O\right]_h G \qquad (7)$$

wherein each $R^5$ is independently the same or different and is a hydrogen, $C_{1-40}$ alkyl, $C_{1-40}$ alkenyl, $C_{1-40}$ alkynyl, $C_{3-40}$ cycloalkyl, $C_{3-40}$ cycloalkenyl, $C_{1-40}$ aryl, $C_{7-40}$ arylalkylene, or $C_{7-40}$ alkylarylene; and each L is independently the same or different and is a $C_{1-12}$ aliphatic or aromatic linking group. In an aspect, each $R^5$ is independently the same or different and is a $C_{1-30}$ alkyl, $C_{1-30}$ alkenyl, $C_{1-30}$ alkynyl, $C_{6-30}$ aryl, $C_{7-30}$ arylalkylene, or $C_{7-14}$ alkylarylene, and each L is independently the same or different and is a $C_{1-6}$ aliphatic or $C_6$ aromatic linking group.

In some aspects, at least one of the $R^5$ groups of formula (6) is a saturated or unsaturated, branched or unbranched $C_{6-40}$ hydrocarbon chain, or a saturated or unsaturated, branched or unbranched $C_{10-30}$ hydrocarbon chain as described above. The hydrocarbon chain preferably is unbranched. Preferably at least one, or all, of the $R^5$ groups of formula (5) is a linear $C_{6-40}$ or $C_{10-30}$ alkyl group. In this aspect the other of the $R^5$ groups can be $C_{1-12}$ alkyl, $C_{1-12}$ alkenyl, $C_{1-12}$ alkynyl, $C_{6-12}$ aryl, $C_{7-13}$ arylalkylene, or $C_{7-13}$ alkylarylene. Alternatively in this aspect, the other of the $R^5$ groups can be $C_{1-6}$ alkyl, $C_{1-6}$ alkenyl, $C_{6-12}$ aryl, $C_{7-13}$ arylalkylene, or $C_{7-13}$ alkylarylene.

In another aspect, the sulfur-containing stabilizer compound can be a thioether ester compound of formula (7a)

$$\left[R^5—S—(CH_2)_g—\overset{\displaystyle O}{\overset{\|}{C}}—O\right]_h G \qquad (7a)$$

wherein each $R^5$ is independently the same or different and is a $C_{1-40}$ alkyl, $C_{1-40}$ alkenyl, $C_{1-40}$ alkynyl, $C_{3-40}$ cycloalkyl, $C_{3-40}$ cycloalkenyl, $C_{1-40}$ aryl, $C_{7-40}$ arylalkylene, or $C_{7-40}$ alkylarylene, G is a $C_{2-20}$ hydrocarbyl having a valence h, g is 1-40, and h is 2-6, provided that at least one $R^5$ has 5-40 or 10-30 carbon atoms or at least one g is 5-40 or 10-30. In an aspect, each $R^5$ is a $C_{5-40}$ alkyl, $C_{5-40}$ alkenyl, or $C_{5-40}$ alkynyl, G is a $C_{2-8}$ alkyl having a valence h, g is 1-6, or 1, 2, or 4 and h is 2-6. In a preferred aspect, each $R^5$ is independently the same or different linear $C_{5-40}$ or $C_{10-30}$ alkyl group, G is a $C_{2-8}$ alkyl having a valence h, each g is the same and is 1-6, or 1-4, and h is 2-4. Preferred sulfur-containing stabilizers of this type include 2,2-bis[[3-(dodecylthio)-1-oxopropoxy]methyl]propane-1,3-diyl bis[3-(dodecylthio)propionate of formula (7b).

(7b)

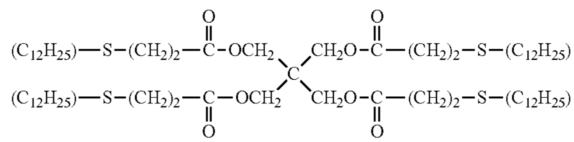

In a preferred aspect, the sulfur-containing stabilizer compound is soluble in an organic solvent that also dissolves the high heat copolycarbonate, and has low solubility in an aqueous solvent at a pH of less than 11. These characteristics allow the sulfur-containing stabilizer to be added before, during, or after manufacture of the high heat copolycarbonate, and remain with the high heat copolycarbonate compositions in the organic phase during the separation of the brine phase or the extraction of the organic phase with an acidic aqueous phase or a neutral pH phase. In an aspect, the sulfur-containing stabilizer can have a solubility of 5 g in 20 mL of an organic phase solvent. The organic solvent is selected to dissolve the high heat copolycarbonate, and can be a halogenated solvent such as methylene chloride, chlorobenzene, dichlorobenzene, or a combination thereof. Conversely, the sulfur-containing stabilizer can have a solubility of less than 0.5 mg in 10 mL of water or brine, each at a pH of less than 11 or less than 7. In an aspect, the sulfur-containing stabilizer can have a solubility of less than 100 ppm, or more preferably less than 50 ppm in the water or a brine phase.

The sulfur-containing stabilizer compound can be used in an amount effective for the stabilizer to provide 5-50 ppm of added sulfur, i.e., stabilizer-added sulfur, based on the parts by weight of the copolycarbonate in the thermoplastic composition. When the sulfur-containing stabilizer compound is present in the thermoplastic composition, a lower amount of the sulfur-containing monomers or the endcaps or both can be used to obtain the desired total added sulfur content. When the sulfur-containing stabilizer compound is present, the total added sulfur content (the added sulfur from the sulfur-containing monomers, the endcaps (if present), and the sulfur-containing stabilizer compound) can be 5-150 ppm, or 10-100 ppm, or 15 to 100 ppm, or 15-50 ppm, or 10-50 ppm, or 10-25 ppm, or 10-20 ppm.

The sulfur-containing stabilizer compound in some aspects improves the color stability of the composition after the composition is molded under aggressive conditions, e.g., at high melt temperatures, such as 350° C. or higher, or prolonged residence times during molding, such as times exceeding 7.5 or 10 minutes, or both. In some aspects it is possible to simultaneously improve the initial color of the thermoplastic composition and the color stability of the composition after the composition is molded under aggressive conditions, typically at high melt temperatures, such as 350° C. or higher, or prolonged residence times during molding, such as times exceeding 7.5 or 10 minutes, or both.

In some aspects, the thermoplastic compositions can further include a sulfonic acid stabilizer also referred to herein as an "organosulfonic stabilizer". The organosulfonic stabilizer can be an aryl or aliphatic sulfonic acid, including a polymer thereof, an aryl or an aliphatic sulfonic acid anhydride, or an aryl or aliphatic ester of an aryl or aliphatic sulfonic acid, or a polymer thereof. In particular, the organosulfonic stabilizer is a $C_{1-30}$ alkyl sulfonic acid, a $C_{6-30}$ aryl sulfonic acid, a $C_{7-30}$ alkylarylene sulfonic acid, a $C_{7-30}$ arylalkylene sulfonic acid, or an aromatic sulfonic acid polymer; an anhydride of a $C_{1-30}$ alkyl sulfonic acid, a $C_{6-30}$ aryl sulfonic acid, a $C_{7-30}$ alkylarylene sulfonic acid, or a $C_{7-30}$ arylalkylene sulfonic acid; or a $C_{6-30}$ aryl ester of: a $C_{1-30}$ alkyl sulfonic acid, a $C_{6-30}$ aryl sulfonic acid, a $C_{7-30}$ alkylarylene sulfonic acid, a $C_{7-30}$ arylalkylene sulfonic acid, or an aromatic sulfonic acid polymer; or a $C_{1-30}$ aliphatic ester of: a $C_{1-30}$ alkyl sulfonic acid, a $C_{6-30}$ aryl sulfonic acid, a $C_{7-30}$ alkylarylene sulfonic acid, a $C_{7-30}$ arylalkylene sulfonic acid, or an aromatic sulfonic acid polymer. A combination of one or more of the foregoing can be used.

In an aspect, the organosulfonic stabilizer is of formula (8).

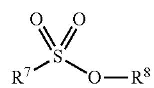

(8)

In formula (8), $R^7$ is each independently a $C_{1-30}$ alkyl, $C_{6-30}$ aryl, $C_{7-30}$ alkylarylene, $C_{7-30}$ arylalkylene, or a polymer unit derived from a $C_{2-32}$ ethylenically unsaturated aromatic sulfonic acid or its corresponding $C_{1-32}$ alkyl ester. The $C_{2-32}$ ethylenically unsaturated aromatic sulfonic acid can be of the formula

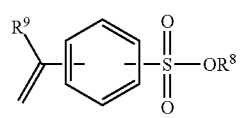

wherein $R^9$ is hydrogen or methyl and $R^8$ is as defined in formula (8). Preferably the ethylenically unsaturated group and the sulfonic acid or ester group are located para on the phenyl ring.

Further in formula (8), $R^8$ is hydrogen; or $R^8$ is $C_{1-30}$ alkyl; or $R^8$ is a group of the formula $—S(═O)_2—R^7$. When $R^8$ is a group of the formula $—S(═O)_2—R^7$, each $R^7$ in the compound of formula (8) can be the same or different, but preferably each $R^7$ is the same.

In an aspect in formula (8), $R^7$ is a $C_{6-12}$ aryl, $C_{7-24}$ alkylarylene, or a polymer unit derived from a $C_{2-14}$ ethylenically unsaturated aromatic sulfonic acid or its ester; and $R^8$ is hydrogen, $C_{1-24}$ alkyl, or a group of the formula $—S(═O)_2—R^7$ wherein $R^7$ is a $C_{6-12}$ aryl or $C_{7-24}$ alkylarylene. In another aspect in formula (8), $R^7$ is a $C_{7-10}$ alkylarylene or a polymer unit derived from a $C_{2-14}$ ethylenically unsaturated aromatic sulfonic acid, and $R^8$ is a hydrogen, $C_{1-25}$ alkyl, or a group of the formula $—S(═O)_2—R^7$ wherein $R^7$ is a $C_{7-10}$ alkylarylene. In still another aspect, $R^7$ is a $C_{7-10}$ alkylarylene and $R^8$ is a hydrogen or $C_{1-6}$ alkyl. In still another aspect, $R^7$ is a $C_{7-10}$ alkylarylene and $R^8$ is a hydrogen or $C_{12-25}$ alkyl, or $R^8$ is a $C_{14-20}$ alkyl. In another aspect, $R^7$ is a polymer unit derived from a $C_{2-14}$ ethylenically unsaturated aromatic sulfonic acid, preferably p-styrene sulfonic acid or para-methyl styrene sulfonic acid, such that in formula (8) $R^8$ is hydrogen.

The organosulfonic stabilizer can be a $C_{1-10}$ alkyl ester of a $C_{7-12}$ alkylarylene sulfonic acid, preferably of p-toluene sulfonic acid. More preferably the stabilizer is a $C_{1-6}$ alkyl ester of p-toluene sulfonic acid, such as butyl tosylate. In another aspect, the organosulfonic stabilizer is an anhydride of a $C_{7-12}$ alkylarylene sulfonic acid, preferably para-toluene sulfonic anhydride. In still another aspect, $R^7$ is a $C_{11-24}$ alkylarylene sulfonic acid, and $R^8$ is hydrogen. Alternatively, $R^7$ is a $C_{16-22}$ alkylarylene sulfonic acid, and $R^8$ is hydrogen.

When present, the amount of the organosulfonic stabilizer used can be that amount effective to provide 2-40 ppm, or 2-20 ppm, or 4-15 ppm, or 4-10 ppm, or 4-8 ppm of added sulfur, i.e., organosulfonic stabilizer-added sulfur, to the copolycarbonates, each based on parts by weight of the copolycarbonate. When the organosulfonic stabilizer is present, a lower amount of the sulfur-containing monomers, endcaps, or sulfur-containing stabilizer can be used to obtain the desired total added sulfur content. When the organosulfonic stabilizer is present, the total added sulfur content (the added sulfur from the sulfur-containing monomers, the endcaps if present, the sulfur-containing stabilizer compounds if present, and the organosulfonic stabilizer) can be 7 to 100 ppm, or 10-100 ppm, or 15-100 ppm, or 15-50 ppm, or 17-100 ppm, or 17-50 ppm, or 10 to 50 ppm, or 10-25 ppm, or 10-20 ppm, each based on the total parts by weight of the high heat copolycarbonates.

The total sulfur content of the thermoplastic composition (from all sources) can be 3-150 ppm, or 3-100 ppm, or 5-100 ppm, or 5-50 ppm, each by weight.

The thermoplastic composition can contain an epoxy additive. The inclusion of an epoxy compound can be used as a chain extender to improve molecular weight stability of the thermoplastic composition after hydroaging (for instance at 85° C. and 85% relative humidity) or autoclaving at temperatures of 121° C., 134° C., 155° C., or other temperatures above 100° C. Epoxy compounds useful as additives include epoxy modified acrylic oligomers or polymers (such as a styrene-acrylate-epoxy polymer, prepared from for example a combination of: a substituted or unsubstituted styrene such as styrene or 4-methylstyrene; an acrylate or methacrylate ester of a $C_{1-22}$ alkyl alcohol such as methyl acrylate, methyl methacrylate, ethyl acrylate, butyl acrylate, or the like; and an epoxy-functionalized acrylate such as glycidyl acrylate, glycidyl methacrylate, 2-(3,4-epoxycyclohexyl)ethyl acrylate, 2-(3,4-epoxycyclohexyl)ethyl methacrylate, or the like), or an epoxy carboxylate oligomer based on cycloaliphatic epoxides (such as 3,4-epoxycyclohexylmethyl-3,4-epoxycyclohexylcarboxylate, or the like). Specific commercially available exemplary epoxy functionalized stabilizers include ERL-4221 from various suppliers; and epoxy modified acrylates such as JONCRYL ADR-4300 and JONCRYL ADR-4368, available from BASF. Epoxy additives are typically used in amounts of up to 1 wt %, or 0.001-1 wt %, or 0.001-0.5 wt %, or 0.001-0.3 wt %, or 0.01-0.3 wt %, or 0.1-0.3 wt %, based on the total weight of the thermoplastic composition, excluding any filler.

The thermoplastic compositions can include various other additives ordinarily incorporated into polycarbonate compositions, with the proviso that the additive(s) are selected so as to not significantly adversely affect the desired properties of the thermoplastic composition, in particular melt flow, optical clarity, and thermal properties. Such additives can be mixed at a suitable time during the mixing of the components for forming the composition. Additives include antioxidants, heat stabilizers, light stabilizers, ultraviolet (UV) light stabilizers, plasticizers, lubricants, mold release agents, antistatic agents, colorants such as organic dyes, surface effect additives, radiation stabilizers, flame retardants, anti-drip agents, and impact modifiers. In an aspect, the thermoplastic composition further comprises a processing aid, an antioxidant or a heat stabilizer, an ultraviolet light absorber, a colorant, a flame retardant, an impact modifier, or a combination thereof. A combination of additives can be used, for example a combination of a heat stabilizer, mold release agent, and ultraviolet light stabilizer. In general, the additives are used in the amounts generally known to be effective. For example, the total amount of the additives (other than any impact modifier, filler, or reinforcing agents) can be 0-5 wt % or 0.01-5 wt %, based on the total weight of the thermoplastic composition, excluding any filler.

Antioxidant additives and heat stabilizers include organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite; alkylated monophenols or polyphenols; alkylated reaction products of polyphenols with dienes, such as tetrakis[methylene(3,5-di-tert-butyl-4-hydroxyhydrocinnamate)] methane; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate; amides of beta-(3,5-di-tert-butyl-4-hydroxyphenyl)-propionic acid, organophosphites such as triphenyl phosphite, tris-(2, 6-dimethylphenyl)phosphite, tris-(mixed mono- and di-nonylphenyl)phosphite; phosphonates such as dimethylbenzene phosphonate, phosphates such as trimethyl phosphate. A combination can be used. Antioxidants and heat stabilizers can be used in amounts of 0.01-0.1 parts by weight, based on 100 parts by weight of the thermoplastic composition, excluding any filler.

Light stabilizers, including ultraviolet light (UV) absorbers, can also be used. Light stabilizers include benzotriazoles such as 2-(2-hydroxy-5-methylphenyl)benzotriazole and 2-(2-hydroxy-5-tert-octylphenyl)-benzotriazole, 2-hydroxy-4-n-octoxy benzophenone, or a combination thereof. UV absorbing additives include hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol; 2-hydroxy-4-n-octyloxybenzophenone; 2-[4,6-bis(2,4-dimethylphenyl)-1,3,5-triazin-2-yl]-5-(octyloxy)-phenol; 2,2'-(1,4-phenylene)bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; 2,2'-(1,4-phenylene) bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; phenol, nano-size inorganic materials such as titanium oxide, cerium oxide, and zinc oxide, all with particle size less than or equal to 100 nanometers, a combination of different light stabilizers can be used. Light stabilizers are used in amounts of 0.01-5 parts by weight, based on 100 parts by weight of the thermoplastic composition, excluding any filler.

There is considerable overlap among plasticizers, lubricants, and mold release agents, which include, for example, phthalic acid esters (e.g, octyl-4,5-epoxy-hexahydrophthalate), tris-(octoxycarbonylethyl)isocyanurate, di- or polyfunctional aromatic phosphates (e.g, resorcinol tetraphenyl diphosphate (RDP), the bis(diphenyl) phosphate of hydroquinone and the bis(diphenyl) phosphate of bisphenol A); poly-alpha-olefins; epoxidized soybean oil; silicones, including silicone oils (e.g., poly(dimethyl diphenyl siloxanes); fatty acid esters (e.g, alkyl stearyl esters such as methyl stearate and stearyl stearate, and esters of stearic acid such as pentaerythritol tetrastearate (PETS), glycerol tristearate (GTS), and the like), waxes (e.g, beeswax, montan wax, paraffin wax, or the like), or combination thereof. These are generally used in amounts of 0.01 to 5 parts by weight, based on 100 parts by weight of the thermoplastic composition, excluding any filler.

The thermoplastic compositions can optionally include flame retardants of various types and in known amounts, as described, for example, in US 2014/0295363 and US 2018/0066135. In an aspect, a brominated flame retardant such as a brominated polycarbonate can be used. In another aspect, the flame retardant can be a flame retardant salt, for example an alkali metal salt of a perfluorinated $C_{1-16}$ alkyl sulfonate, such as potassium perfluorobutane sulfonate (Rimar salt), potassium perfluoroctane sulfonate, tetraethylammonium perfluorohexane sulfonate, potassium diphenylsulfone sulfonate (KSS); a sodium benzene sulfonate such as sodium toluene sulfonate (NATS); an alkali metal or alkaline earth metal salt of carbonic acid, such as $Na_2CO_3$, $K_2CO_3$, MgCO3, $CaCO_3$, and $BaCO_3$; or a fluoro-anion complex such as $Li_3AlF_6$, $BaSiF_6$, $KBF_4$, $K_3AlF_6$, $KAlF_4$, $K_2SiF_6$, or $Na_3AlF_6$. Rimar salt, KSS, and NATS, alone or in combination with other flame retardants, are particularly useful. A cyclic siloxane or a linear siloxane can be used to impart flame retardant properties. Examples of cyclic siloxanes include octaphenylcyclotetrasiloxane, hexamethylcyclotrisiloxane, octamethylcyclotetrasiloxane, decamethylcyclopentasiloxane, dodecamethylcyclohexasiloxane, trimethyltriphenylcyclotrisiloxane, and tetramethyltetraphenylcyclotetrasiloxane. Octaphenylcyclotetrasiloxane is preferred. The linear siloxanes can be a linear phenyl-containing siloxane such as a poly(phenylmethylsiloxane).

Organophosphorus flame retardants can be used. Organophosphorus flame retardants include aromatic organophosphorus compounds having at least one organic aromatic group and at least one phosphorus-containing group, as well as organic compounds having at least one phosphorus-nitrogen bond. Examples of organophosphorus compounds having at least one organic aromatic group include phenyl bis(dodecyl) phosphate, phenyl bis(neopentyl) phosphate, phenyl bis(3,5,5'-trimethylhexyl) phosphate, ethyl diphenyl phosphate, 2-ethylhexyl di(p-tolyl) phosphate, bis(2-ethylhexyl) p-tolyl phosphate, tritolyl phosphate, bis(2-ethylhexyl) phenyl phosphate, tri(nonylphenyl) phosphate, bis(dodecyl) p-tolyl phosphate, dibutyl phenyl phosphate, 2-chloroethyl diphenyl phosphate, p-tolyl bis(2,5,5'-trimethylhexyl) phosphate, 2-ethylhexyl diphenyl phosphate, triphenyl phosphate, tricresyl phosphate, isopropylated triphenyl phosphate, resorcinol tetraphenyl diphosphate (RDP), the bis(diphenyl) phosphate of hydroquinone, bisphenol A bis(diphenyl) phosphate (BPADP), and their oligomeric and polymeric counterparts, or a combination thereof. The organic compound containing a phosphorus-nitrogen bond can be a phosphazene, phosphonitrilic chloride, phosphorus ester amide, phosphoric acid amide, phosphonic acid amide, phosphinic acid amide, or tris(aziridinyl) phosphine oxide.

The thermoplastic compositions can be manufactured by various methods known in the art. For example, powdered copolycarbonate, and other optional components are first blended, optionally with any fillers, in a high-speed mixer or by hand mixing. The blend is then fed into the throat of a twin-screw extruder via a hopper. Alternatively, at least one of the components can be incorporated into the composition by feeding it directly into the extruder at the throat or downstream through a sidestuffer, or by being compounded into a masterbatch with a desired polymer and fed into the extruder. The extruder is generally operated at a temperature higher than that necessary to cause the composition to flow. The extrudate can be immediately quenched in a water bath and pelletized. The pellets so prepared can be one-fourth inch long or less as desired. Such pellets can be used for subsequent molding, shaping, or forming.

In certain aspects, which are preferred, the thermoplastic compositions can have a low residual impurity content, in particular less than 2 ppm by weight of each of lithium, sodium, potassium, calcium, magnesium, ammonium, chloride, bromide, fluoride, nitrite, nitrate, phosphite, phosphate, sulfate, acetate, citrate, oxalate, trimethylammonium, and triethylammonium. It is to be understood that the foregoing residual impurities can exist in the thermoplastic compositions in un-ionized form (for example as triethylamine or formic acid), but are determined based on their ionized form.

The thermoplastic compositions can be molded under standard molding conditions in range of 300-350° C. depending on the Tg of the composition. For example, the thermoplastic compositions can be molded at a temperature of 100-175° C. above the Tg of the thermoplastic composition for a residence time of 2-20 minutes.

The thermoplastic compositions can have a Tg of 200° C. or higher, or 200-260° C., determined by DSC in accordance with ASTM D3418 with a 20° C./min heating rate.

The thermoplastic compositions can have excellent transparency. In an aspect, the thermoplastic compositions can have a haze of less than 5%, or less than 3%, or less than 1.5%, or less than 1.0%, and a transmission greater than 82%, preferably greater than 84%, preferably greater than 85%, or greater than 86% each measured as per ASTM D1003-00 using the color space CIE1931 (Illuminant C and a 2° observer) on a molded plaque with a 3.2 mm thickness. In another aspect, the thermoplastic compositions can have a haze of less than 15%, or less than 10%, more preferably less than 5%, even more preferably less than 1.5%, or less than 1.0% and a total transmission greater than 84% or greater than 86%, each measured as per ASTM D1003-00 on a molded plaque with a 3.0 mm thickness.

The thermoplastic compositions can have excellent color. In an aspect, the thermoplastic compositions have a yellowness index (YI) of less than 30, preferably less than 20, more preferably less than 10 measured as per ASTM D1925 on a plaque of 3.2 mm thickness molded at a temperature of 350° C. for a residence time of 2 minutes.

The thermoplastic compositions can be used in articles including a molded article, a thermoformed article, an extruded film, an extruded sheet, one or more layers of a multi-layer article, a substrate for a coated article, or a substrate for a metallized article. Optionally, the article has no significant part distortion or discoloration when the article is subjected to a secondary operation such as over-molding, lead-free soldering, wave soldering, low temperature soldering, or coating, or a combination thereof. The articles can be partially or completely coated with, e.g., a hard coat, a UV protective coat, an anti-refractive coat, an anti-reflective coat, a scratch resistant coat, or a combination thereof, or metallized.

Exemplary articles include a lens, a light guide, a waveguide, a collimator, an optical fiber, a window, a door, a visor, a display screen, an electronic device, a scientific or medical device, an autoclavable article, a safety shield, a fire shield, wire or cable sheathing, a mold, a dish, a tray, a screen, an enclosure, glazing, packaging, a gas barrier, an anti-fog layer, or an anti-reflective layer.

The compositions can be used in component of a device comprising a lens, a device comprising a light guide, a device comprising a waveguide, a device comprising a collimator, a device comprising an optical fiber, a device comprising a lighting element, a device comprising a window, a device comprising a door, or the article is a structural component of a vehicle, a building, or an appliance, or the article is a component of a medical device, a component of a display screen, a component of an electronic device, a component of a safety device, a component of a screen, a component of conveyor, a component of a mold, a component of a dish, a component of an enclosure, a component of packaging, a component of a gas barrier, a component of an encapsulant, or a component of a label.

The thermoplastic compositions can be provided as pellets, and are useful to form transparent optical devices such as windows, sight glasses, visors, films, and lenses via various methods. The methods to make the optical articles are not particularly limited. Exemplary methods include part production via multi-cavity tools; molding such as injection molding, gas assist injection molding, vacuum molding, over-molding, compression molding, rotary molding, heat/cool molding, overmolding, transfer molding, or cavity molding; thermoforming; extruding; calendaring; casting; and the like. Optionally the lens can be hardcoated.

Advantageously, the optical articles can have no significant part distortion or discoloration when the articles are subjected to a secondary operation such as over-molding, or coating with high temperature curing, or a combination thereof. High temperature cure of a coating can be, for example, 100° C. or higher, for example 100-250° C. In some aspects, "no significant part distortion" includes a volume distortion of less than 10 volume percent (vol %), or less than 5 vol %, or less than 1 vol %. Significant discoloration can be detected by the unaided eye at a distance of 18 inches. The thermoplastic compositions, which have good flow (MVR) for excellent mold filling properties while maintaining desirable mechanical properties can, in the manufacture of optical articles, provide a high degree of reproducibility for successive optical articles molded from the thermoplastic composition.

The lens can be a planar (flat) lens, a curved lens, a cylindrical lens, a toric lens, a sphero-cylindrical lens, a fresnel lens, a convex lens, a biconvex lens, a concave lens, a biconcave lens, a convex-concave lens, a plano-convex lens, a plano-concave lens, a lenticular lens, a gradient index lens, an axicon lens, a conical lens, an astigmatic lens, an aspheric lens, a corrective lens, a diverging lens, a converging lens, a compound lens, a photographic lens, a doublet lens, a triplet lens, an achromatic lens, or a multi-array lens. Thus, the lens can be a layer of a multi-layer lens.

The lens can have an overall diameter of 0.1 mm-500 cm, or 0.25 mm-cm, or 0.5 mm-2 cm, or 0.5-20 mm. The lenses can have surface textures such as a macrotexture, a microtexture, a nanotexture, or a combination thereof on a surface of the lenses. Textures can also be imparted to the lenses using methods known in the art including but not limited to calendaring or embossing techniques. In an aspect, the lenses can pass through a gap between a pair of rolls with at least one roll having an embossed pattern thereon, to transfer the embossed pattern to a surface of the lenses. Textures can be applied to control gloss or reflection.

The shape of the lenses is not particularly limited. The lenses can also have different types. For example, the lenses can be a flat or planar lens, a curved lens, a cylindrical lens, a toric or sphero-cylindrical lens, a fresnel lens, a convex lens, a biconvex lens, a concave lens, a biconcave lens, a convex-concave lens, a plano-convex lens, a plano-concave lens, a lenticular lens, a gradient index lens, an axicon lens, a conical lens, an astigmatic lens, an aspheric lens, a corrective lens, a diverging lens, a converging lens, a compound lens, a photographic lens, a doublet lens, a triplet lens, an achromatic lens, or a multi-array lens.

The optical articles such as lenses can further comprise an indicium or a coating disposed on at least a portion of one or both sides of the lens to impart additional properties such as scratch resistance, ultra violet light resistance, aesthetic appeal, hydrophilicity, hydrophobicity, and the like. In an aspect, the coating is a hard coat, a UV protective coat, an anti-refractive coat, an anti-reflective coat, a scratch resistant coat, a hydrophobic coat, a hydrophilic coat, or a combination thereof. Coatings can be applied through standard application techniques such as overmolding, rolling, spraying, dipping, brushing, flow coating, or a combination thereof.

Depending on the applications, at least a portion of a surface of the optical articles such as lens is metallized in some aspects. A metal layer can be disposed onto the surface of the optical articles with the aid of electrocoating deposition, physical vapor deposition, or chemical vapor deposition or a suitable combination of these methods. Sputtering processes can also be used. The metal layer resulting from the metallizing process (e.g., by vapor deposition) can be 0.001-50 micrometers (μm) thick. Chrome, nickel, aluminum, and the like can be listed as examples of vaporizing metals. Aluminum vapor deposition is used in an aspect as metal vapor deposition. The surface of the molded substrate can be treated with plasma, cleaned, or degreased before vapor deposition in order to increase adhesion.

The optical articles such as lenses can have low birefringence, which means that the optical articles can have low light distortion and a better-quality image.

Exemplary lenses include a camera lens, a sensor lens, an illumination lens, a safety glass lens, an ophthalmic corrective lens, or an imaging lens.

The foregoing types of lenses can be used in a wide variety of applications. For example, the camera lens can be a mobile phone camera lens, a table camera lens, a security camera lens, a mobile phone camera lens, a tablet camera lens, a laptop camera lens, a security camera lens, a camera sensor lens, a copier camera lens, or a vehicle camera lens (e.g., an automotive camera lens).

The sensor lens can be a motion detector lens, a proximity sensor lens, a gesture control lens, an infrared sensor lens, or a camera sensor lens.

The illumination lens can be an indoor lighting lens, an outdoor lighting lens, vehicle headlamp lens, a vehicle foglight lens, a vehicle rearlight lens, a vehicle running light lens, a vehicle foglight lens, a vehicle interior lens, a light emitting diode (LED) lens, or an organic light emitting diode (OLED) lens. The safety glass lens is a glasses lens, a goggles lens, a visor, a helmet lens, or other protective gear.

The ophthalmic corrective lens can be incorporated into monocles, corrective glasses (including bifocals, trifocals, progressive lens, and the like), contact lenses, and the like.

The imaging lens can be a scanner lens, a projector lens, a magnifying glass lens, a microscope lens, a telescope lens, a security lens, reading glasses lens, and the like.

Accordingly, the lenses can be incorporated into a wide variety of devices, including a camera (including reflex cameras), an electronic device (such as mobile phones, tablets, laptop computers, and desk computers), a vehicle (which as used herein means any transportation devices, for example bicycles, scooters, motorcycles, automobiles, buses, trains, boats, ships, and aircraft) a flashlight, a business machine (such as a copier or a scanner), a lighting device (including indoor lighting such as table lamps and ceiling lights, outdoor lighting such as floodlights and streetlights, vehicle headlights, rearlights, side lights, running lights, foglights, and interior lights), an imaging device (such as a microscope, a telescope, a projector, a security lens (e.g. in a door), or reading glasses), a safety article (such as goggles, glasses, and headgear such as helmets), a vision corrective article (glasses or contact lens), or a toy.

Optical devices can also be windows, and sight glasses such as microwave windows, visors, a safety goggle, a face shield, a fire shield, a helmet, a respirator, a component of a display screen, including a liquid crystal display screen, or an organic light-emitting diode display screen, a component of a screen such as a mining ore screen, a structural component of a building, a vehicle, or an appliance such as a pump, a microwave, a dishwasher, or a stove, a component of packaging, a component of an anti-fog assembly, or a component of an anti-reflective assembly.

The invention is further illustrated by the following non-limiting examples.

EXAMPLES

The following materials were used in the Examples.

| Component | Chemical Description | Source |
|---|---|---|
| BPA | Bisphenol A having a purity of 99.85+% by HPLC with 1 ppm sulfur. | Kumho P&B Chemicals, Inc. |
| BPI | 1,1-Bis-(4-hydroxyphenyl)-3,3,5- trimethylcyclohexane having a minimum purity of 99.96% by HPLC with less than 0.5 ppm sulfur. | Deepak Novochem Tech. Ltd. |
| BPS | 4,4'-Sulfonyldiphenol (Bisphenol S) | Aldrich |
| TDP | 4,4'-Thiodiphenol | Alfa Aesar |
| BuTs | Butyl tosylate | Acros Organics |
| DLTP | Dilauryl thiodipropionate | TCI America |
| BPI/BPA 80/20 | High heat copolycarbonate manufactured from BPI (80 mol %) and BPA (20 mol %) | SABIC |
| BPI/BPA/BPS 80/20/0.01 | High heat copolycarbonate manufactured from BPI (80 mol %), BPA (20 mol %), and 0.01 mol % bisphenol S by the method described below | SABIC |
| BPI/BPA/BPS 80/20/0.05 | High heat copolycarbonate manufactured from BPI (80 mol %), BPA (20 mol %), and 0.05 mol % bisphenol S by the method described below | SABIC |
| BPI/BPA 80/20 + BuTs | Pre-blend of BPI (80 mol %)/BPA (20 mol %) copolycarbonate (267 g) with 0.8 g butyl tosylate | SABIC |

The compositions in the Tables below each contained, in addition to the listed components, 0.08 wt % of a phosphite stabilizer and 0.04 wt % of pentaerythritol tetrastearate (PETS).

Preparation of Sulfur-Containing Copolycarbonates—Exemplary Procedure

The following procedure yielded BPI/BPA/BPS 80/19.99/0.01.

To a mixture of methylene chloride (23 L), deionized (DI) water (8 L), BPA (704.3 g, 3.08 mol), BPI (3831 g, 12.34 mol), BPS (0.386 g, 1.542 mmol), p-cumylphenol (142.11 g, 0.669 mol, 4.34 mol %), triethylamine (25 mL), and sodium gluconate (10 g) in a 75-L reactor equipped with mechanical stirring, recirculation line with pH probe, subsurface phosgene addition, chilled glycol condenser, caustic scrubber for the exit gas, and caustic solution inlet was added phosgene (2546 g, 25.7 mol) at 80 g/min. Aqueous caustic (33 wt %) was added as needed to maintain pH of 8-9 in the reactor. The reactor was then purged with nitrogen. A sample was pulled for GPC analysis. If the batch was complete as indicated by GPC analyses (less than a 150-fold increase between rephosgenations), the batch was transferred to a 100-L work-up tank. The batch was purified on a centrifuge train where the brine phase was separated and the polymer solution in methylene chloride was extracted with aqueous HCl and then washed with DI water until titratable chlorides were less than 5 ppm. The methylene chloride solution was then steam precipitated and the polymer dried under hot nitrogen until volatile levels were less than 0.4 wt %.

Test Methods

Color was determined as yellowness index (YI) as per D1925.

Haze was measured as per ASTM D1003-00 using the color space CIE1931 (Illuminant C and a 2° observer) on a molded plaque with a 3.2 mm thickness.

Percent transmission (% T) was measured as per ASTM D1003-00 on a molded plaque with a 3.0 mm thickness.

Examples 1-10

Each sample contained butyl tosylate. The polymers were compounded on a twin-screw extruder with the additives shown in Table 1. The samples were molded at 662° F. (barrel temperature) and a 35 second cycle time (normal conditions) followed by 689° F. and 60 second cycle time (abusive conditions).

Figure 2:
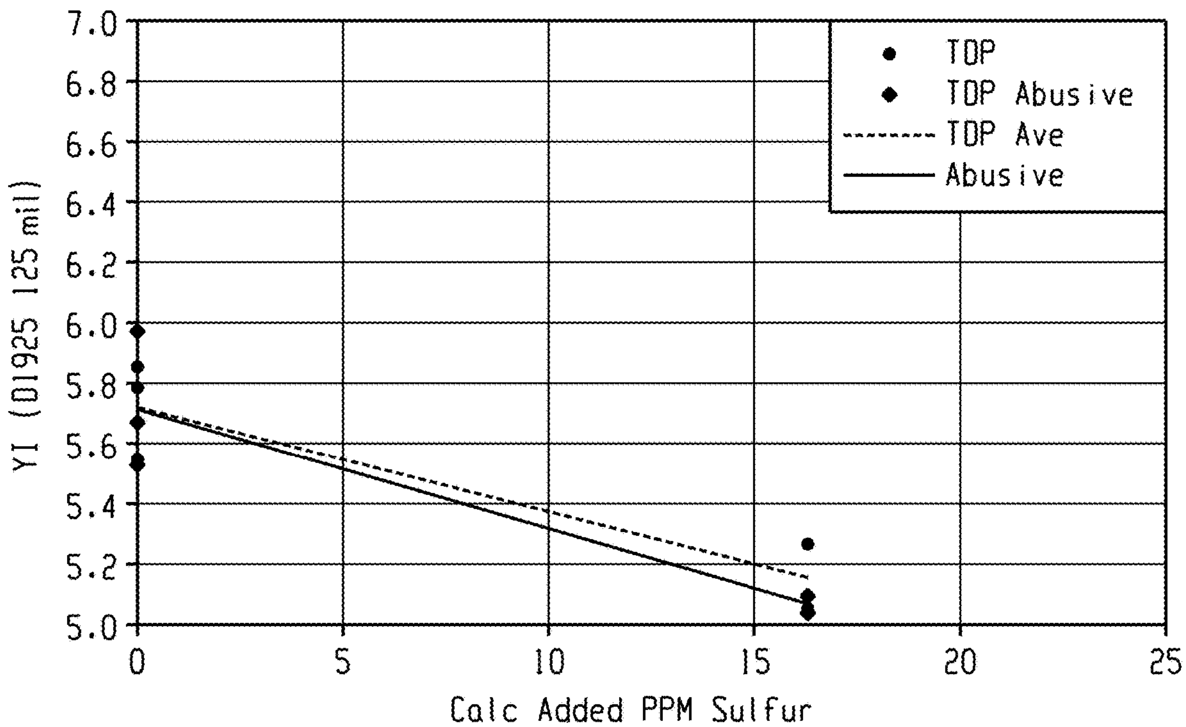
FIG. 2 is a graph of YI values for the compositions shown in Table 2, showing no significant change in YI with increasing molding temperature from 662° F. (35 seconds, “average”) to 689° F., 60 seconds, (“abusive”) with 4,4'-thiodiphenol as the sulfur source.

The color, haze, and percent transmission of the molded samples were compared (Table 2, FIG. 1, and FIG. 2). Comparative Example 1 was excluded from the average since its color and haze was significantly higher than the other 3 samples comparative samples.

TABLE 2

| Examples with butyl tosylate | | | | | | | | | | | | |
|---|---|---|---|---|---|---|---|---|---|---|---|---|
| | | | Ex. No. | | | | | | | | | |
| | | Units | 1* | 2* | 3* | 4* | 5 | 6 | 7 | 8 | 9 | 10 |
| Calc. S content from TDP | | ppm | | | | | | | | | 13 | 13 |
| Calc. S content from BPS | | ppm | | | | | 13 | 13 | 64 | 64 | | |
| BPI/BPA 80/20 | | % | 99.613 | 99.613 | 99.613 | 99.613 | | | | | | |
| BPI/BPA/BPS 80/20/0.01 | | % | | | | | 99.613 | 99.613 | | | | |
| BPI/BPA/BPS 80/20/0.05 | | % | | | | | | | 99.613 | 99.613 | | |
| BPI/BPA/TDP 80/20/0.01 | | % | | | | | | | | | 99.613 | 99.613 |
| BPI/BPA 80/20 + BuTs | | % | 0.267 | 0.267 | 0.267 | 0.267 | 0.267 | 0.267 | 0.267 | 0.267 | 0.267 | 0.267 |
| Molding Conditions | | | | | | | | | | | | |
| Barrel Temp. (° F.) | Cycle Time (sec) | | | | | | | | | | | |
| 662 | 35 | YI | 8.6 | 5.9 | 5.5 | 5.8 | 5.6 | 5.3 | 5.0 | 5.0 | 5.0 | 5.3 |
| 662 | 35 | % T | 87.1 | 89.5 | 89.8 | 89.9 | 90.0 | 90.1 | 90.3 | 90.2 | 90.1 | 90.2 |
| 662 | 35 | Haze | 2.0 | 0.9 | 0.8 | 0.7 | 0.8 | 0.6 | 0.6 | 0.6 | 0.7 | 0.8 |
| 689 | 60 | YI | 9.4 | 6.0 | 5.5 | 5.7 | 5.4 | 5.1 | 4.9 | 4.9 | 5.0 | 5.1 |
| 689 | 60 | % T | 86.6 | 89.4 | 89.8 | 89.8 | 90.1 | 90.1 | 90.3 | 90.2 | 90.1 | 90.2 |
| 689 | 60 | Haze | 2.4 | 1.0 | 0.9 | 0.9 | 0.8 | 0.7 | 0.8 | 0.9 | 0.9 | 0.9 |
| 662 | 35 | Avg. YI | | | | 5.7 | | 5.4 | | 5.0 | | 5.2 |
| 689 | 60 | Avg. YI | | | | 5.7 | | 5.2 | | 4.9 | | 5.1 |

*Comparative example

The results in Table 2 and FIG. 1 show that the color decreases with increasing sulfur content from the BPS monomer. Table 2 and FIG. 2 show that the color decreases with increasing sulfur content from the TDP monomer. The data from Table 1 and FIGS. 1 and 2 show that low levels of sulfur-containing monomers can improve the color of a molded part.

Examples 11-21

None of examples 11-20 contain butyl tosylate. The polymers are compounded on a twin-screw extruder with the additives shown in Table 3. The samples are molded at 662° F. (barrel temperature) and a 35 second cycle time (normal conditions) followed by 689° F. and 60 second cycle time (abusive conditions).

TABLE 3

Examples with no butyl tosylate

| | Units | Ex. No. 11* | 12* | 13* | 14* | 15 | 16 | 17 | 18 | 19 | 20 |
|---|---|---|---|---|---|---|---|---|---|---|---|
| Calc. S content from TDP | ppm | | | | | | | | | 13 | 13 |
| Calc. S content from BPS | ppm | | | | | 13 | 13 | 64 | 64 | | |
| BPI/BPA 80/20 | % | 99.613 | 99.613 | 99.613 | 99.613 | | | | | | |
| BPI/BPA/BPS 80/20/0.01 | % | | | | | 99.613 | 99.613 | | | | |
| BPI/BPA/BPS 80/20/0.05 | % | | | | | | | 99.613 | 99.613 | | |
| BPI/BPA/TDP 80/20/0.01 | % | | | | | | | | | 99.613 | 99.613 |

*Comparative examples

Examples 21-34

Examples 21-27 contain a sulfur additive, in particular dilauryl thiodipropionate (DLTP). Examples 21-37 contain butyl tosylate and Examples 28-34 have no butyl tosylate. The polymers are compounded on a twin-screw extruder with the additives shown in Table 3. The samples are molded at 662° F. (barrel temperature) and a 35 second cycle time (normal conditions) followed by 689° F. and 60 second cycle time (abusive conditions).

TABLE 4

Examples with DLTP and butyl tosylate

| | Units | Ex. No. 21 | 22 | 23 | 24 | 25 | 26 | 27 |
|---|---|---|---|---|---|---|---|---|
| Calc. S content from TDP | ppm | | | | | | 13 | 13 |
| Calc. S content from BPS | ppm | 13 | 13 | 13 | 64 | 64 | | |
| Calc. S content from DLTP | | 5 | 10 | 30 | 5 | 30 | 5 | 30 |
| BPI/BPA/BPS 80/20/0.01 | % | 99.613 | 99.613 | 99.613 | | | | |
| BPI/BPA/BPS 80/20/0.05 | % | | | | 99.613 | 99.613 | | |
| BPI/BPA/TDP 80/20/0.01 | % | | | | | | 99.613 | 99.613 |
| BPI/BPA 80/20 + BuTs | % | 0.267 | 0.267 | 0.267 | 0.267 | 0.267 | 0.267 | 0.267 |
| DLTP | % | 0.008 | 0.0161 | 0.0483 | 0.008 | 0.0483 | 0.008 | 0.0483 |

TABLE 5

Examples with DLTP and no butyl tosylate

| | Units | Ex. No. 28 | 29 | 30 | 31 | 32 | 33 | 34 |
|---|---|---|---|---|---|---|---|---|
| Calc. S content from TDP | Ppm | | | | | | 13 | 13 |
| Calc. S content from BPS | Ppm | 13 | 13 | 13 | 64 | 64 | | |
| Calc. S content from DLTP | | 5 | 10 | 30 | 5 | 30 | 5 | 30 |
| BPI/BPA/BPS 80/20/0.01 | % | 99.613 | 99.613 | 99.613 | | | | |
| BPI/BPA/BPS 80/20/0.05 | % | | | | 99.613 | 99.613 | | |
| BPI/BPA/TDP 80/20/0.01 | % | | | | | | 99.613 | 99.613 |
| DLTP | % | 0.008 | 0.016 | 0.048 | 0.008 | 0.048 | 0.008 | 0.048 |

Set forth below are various aspects of the disclosure.

Aspect 1: A copolycarbonate, comprising: 0.005-0.1 mole percent of sulfur-containing carbonate units derived from a sulfur-containing bisphenol monomer, 2-95 mole percent of high heat carbonate units derived from a high heat aromatic dihydroxy monomer, and 5-98 mole percent of a low heat carbonate units derived from a low heat aromatic monomer, each based on the sum of the moles of the carbonate units; and optionally, thioether carbonyl endcaps of the formula —C(═O)-L-S—R, wherein L is a $C_{1-12}$ aliphatic or aromatic linking group and R is a $C_{1-20}$ alkyl, $C_{6-18}$ aryl, or $C_{7-24}$ arylalkylene; wherein the sulfur-containing carbonate units are present in an amount effective to provide 5-30, or 5-15, or 5-10 parts per million by weight of sulfur, based on parts by weight of the copolycarbonate.

Aspect 2: The copolycarbonate of aspect 1, comprising: 0.005-0.1 mole percent of the sulfur-containing carbonate units; 20-90 mole percent, or 30-80 mole percent of the high heat carbonate units; and 10-80 mole percent, or 20-70 mole percent of bisphenol A carbonate units.

Aspect 3: The copolycarbonate of aspect 1, wherein the high heat aromatic carbonate units are derived from 1,1-bis(4-hydroxyphenyl)-3,3,5-trimethyl-cyclohexane, 4,4'-(1-phenylethylidene)bisphenol, 4,4'-(3,3-dimethyl-2,2-dihydro-1H-indene-1,1-diyl)diphenol, 1,1-bis(4-hydroxyphenyl)cyclododecane, 3,8-dihydroxy-5a,10b-diphenyl-coumarano-2',3',2,3-coumarane, or a combination thereof.

Aspect 4: The copolycarbonate of aspect 1, wherein the sulfur-containing bisphenol monomer is 4,4'-sulfonyldiphenol, 4,4'-sulfinyldiphenol, 4,4'-thiodiphenol, or a combination thereof.

Aspect 5: The copolycarbonate of aspect 1, wherein the thioether carbonyl endcaps are present, and the copolycarbonate has a total added sulfur content of 5-100 ppm, 5-70 ppm by weight, or 5-50 ppm by weight, or 10-50 ppm by weight, based on the total parts by weight of the copolycarbonate.

Aspect 6: The copolycarbonate of aspect 5, wherein the thioether carbonyl endcaps are of the formula

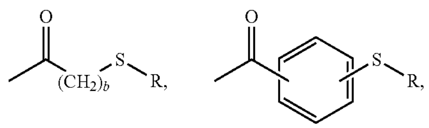

or a combination thereof, wherein R is a $C_{1-20}$ alkyl, $C_{6-18}$ aryl, or $C_{7-24}$ arylalkylene, preferably a $C_{1-14}$ alkyl, $C_{6-12}$ aryl, or a $C_{7-13}$ arylalkylene, and b is 1-5, preferably 1-2, preferably wherein the thioether carbonyl endcaps are of the formula

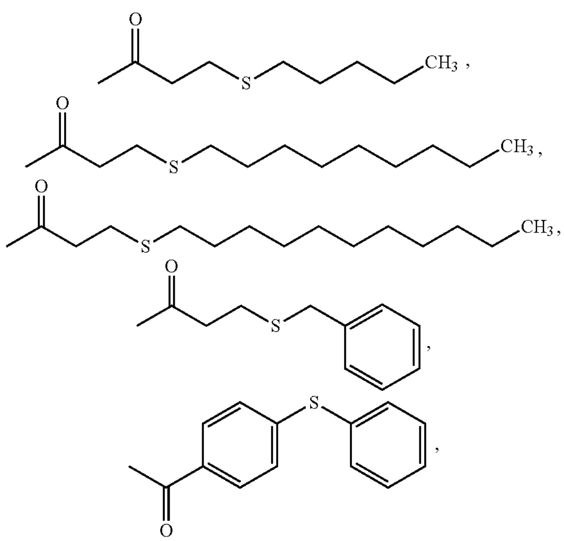

or a combination thereof.

Aspect 7: A method of making the copolycarbonate of aspect 1, the method comprising polymerizing a composition comprising: 0.005-0.1 mole percent of a sulfur-containing bisphenol monomer, 2-95 mole percent of a high heat aromatic dihydroxy monomer, 5-98 mole percent of a low heat dihydroxy monomer, preferably bisphenol A, each based on the sum of the moles of the carbonate units; and optionally, a thioether carbonyl endcapping agent of the formula G-C(=O)-L-S—R, wherein G is leaving group, L is a $C_{1-12}$ aliphatic or aromatic linking group and R is a $C_{1-20}$ alkyl, $C_{6-18}$ aryl, or $C_{7-24}$ arylalkylene; wherein the sulfur-containing bisphenol monomer units are present in an amount effective to provide 5-30, or 5-15, or 5-10 parts per million by weight of added sulfur, based on the total parts by weight of the copolycarbonate Aspect 8: A thermoplastic composition comprising the copolycarbonate of aspect 1, and further comprising an additive, wherein the additive is a sulfur-containing stabilizer compound, preferably wherein the sulfur-containing stabilizer compound is soluble in an organic solvent for the copolycarbonate and is substantially insoluble in an aqueous solvent at a pH of less than 7, a organosulfonic stabilizer, an antioxidant, a heat stabilizer, a light stabilizer, a ultraviolet light stabilizer, a plasticizer, a lubricant, a mold release agent, an antistatic agents, a colorant, a surface effect additive, a radiation stabilizer, a flame retardant, an anti-drip agent, an impact modifier, or a combination thereof.

Aspect 9: The thermoplastic composition of aspect 8, wherein the sulfur-containing stabilizer compound is present, and comprises a $C_{6-40}$ hydrocarbon chain, preferably a $C_{10-30}$ hydrocarbon chain, more preferably a $C_{6-40}$ alkyl group or a $C_{10-30}$ alkyl group.

Aspect 10: The thermoplastic composition of aspect 8 or aspect 9, wherein the sulfur-containing stabilizer compound is a thioether carboxy compound, a thioether dicarboxy compound, a thioether ester compound, or a combination thereof.

Aspect 11: The thermoplastic composition of aspect 8, wherein the sulfur-containing stabilizer compound is dilauryl thiodipropionate, dicetyl thiodipropionate, dimyristyl thiodipropionate, distearyl thiodipropionate, ditridecyl thiodipropionate, 2-bis[[3-(dodecylthio)-1-oxopropoxy]methyl] propane-1,3-diyl bis[3-(dodecylthio)propionate, or a combination thereof.

Aspect 12: The thermoplastic composition of aspect 8, wherein the sulfur-containing stabilizer compound is present in an amount effective to provide 5-50 parts per million by weight of sulfur, based on the total parts by weight of the copolycarbonate.

Aspect 13: The thermoplastic composition of aspect 8, wherein the organosulfonic stabilizer is present in an amount effective to provide 2-40 ppm, or 2-20 ppm, or 4-15 ppm, or 4-10 ppm, or 4-8 parts per million by weight of sulfur, based on the total parts by weight of the copolycarbonate.

Aspect 14: The thermoplastic composition of aspect 8, having one of the following properties: less than 5 parts per million by weight each of lithium, sodium, potassium, calcium, magnesium, ammonium, chlorine, bromine, fluorine, nitrite, nitrate, phosphite, phosphate, sulfate, formate, acetate, citrate, oxalate, trimethylammonium, triethylammonium, or a combination thereof as measured by ion chromatography; the copolycarbonate is prepared from monomers wherein one of the monomers has a purity of at least 99.6%, or at least 99.7% as determined by high performance liquid chromatography; or a yellowness index of less than or equal to 30, or less than 20, or less than 10 as measured by ASTM D1925 on a 3.2 mm plaque.

Aspect 15: An article comprising the thermoplastic composition of aspect 8, wherein the article is optionally a camera lens, a sensor lens, an illumination lens, a safety glass lens, an ophthalmic corrective lens, or an imaging lens; optionally wherein the lens is hardcoated.

Aspect 16: An article comprising the thermoplastic composition of any one of aspects 8-14, wherein a surface of the article is optionally metallized.

The singular forms "a", "an", and "the" include plural referents unless the context clearly dictates otherwise. "Or" means "and/or". The endpoints of all ranges directed to the same component or property are inclusive and independently combinable. Unless defined otherwise, technical and scientific terms used herein have the same meaning as is commonly understood by one of skill in the art to which this invention belongs. As used herein, a "combination" is inclusive of blends, mixtures, alloys, reaction products, and the like. A "combination thereof" is open and includes any combination comprising at least one of the listed components or properties optionally together with a like or equivalent component or property not listed.

Compounds are described using standard nomenclature. For example, any position not substituted by any indicated group is understood to have its valency filled by a bond as indicated, or a hydrogen atom. A dash ("—") that is not between two letters or symbols is used to indicate a point of attachment for a substituent. For example, —CHO is attached through carbon of the carbonyl group.

As used herein, the terms "hydrocarbyl" and "hydrocarbon" refer broadly to a substituent comprising carbon and hydrogen, optionally with 1-3 heteroatoms, for example, oxygen, nitrogen, halogen, silicon, sulfur, or a combination thereof; "alkyl" means a straight or branched chain, saturated monovalent hydrocarbon group; "alkylene" means a straight or branched chain, saturated, divalent hydrocarbon group; "alkylidene" means a straight or branched chain, saturated divalent hydrocarbon group, with both valences on a single common carbon atom; "alkenyl" means a straight or branched chain monovalent hydrocarbon group having at least two carbons joined by a carbon-carbon double bond; "aryl" means an aromatic monovalent group containing only carbon in the aromatic ring or rings; "arylene" means an aromatic divalent group containing only carbon in the aromatic ring or rings; "alkylarylene" means an aryl group that has been substituted with an alkyl group as defined above, with 4-methylphenyl being an exemplary alkylarylene group; "arylalkylene" means an alkyl group that has been substituted with an aryl group as defined above, with benzyl being an exemplary arylalkylene group.

Unless otherwise indicated, each of the foregoing groups can be unsubstituted or substituted, provided that the substitution does not significantly adversely affect synthesis, stability, or use of the compound. The term "substituted" as used herein means that at least one hydrogen on the designated atom or group is replaced with another group, provided that the designated atom's normal valence is not exceeded. When the substituent is oxo (i.e., =O), then two hydrogens on the atom are replaced. Combinations of substituents or variables are permissible provided that the substitutions do not significantly adversely affect synthesis or use of the compound. Groups that can be present on a substituted position include (—$NO_2$), cyano (—CN), halogen, thiocyano (—SCN), $C_{2-6}$ alkanoyl (e.g., acyl ($H_3CC$(=O)—)); carboxamido; $C_{1-6}$ or $C_{1-3}$ alkyl, cycloalkyl, alkenyl, and alkynyl; $C_{1-6}$ or $C_{1-3}$ alkoxy; $C_{6-10}$ aryloxy such as phenoxy; $C_{1-6}$ alkylthio; $C_{1-6}$ or $C_{1-3}$ alkylsulfinyl; $C_{1-6}$ or $C_{1-3}$ alkylsulfonyl; $C_{6-12}$ aryl having at least one aromatic rings (e.g., phenyl, biphenyl, naphthyl, or the like, each ring either substituted or unsubstituted aromatic); $C_{7-19}$ arylalkylene having 1-3 separate or fused rings and 6-18 ring carbon atoms; or arylalkyleneoxy having 1-3 separate or fused rings and 6-18 ring carbon atoms. The stated number of carbon atoms includes any substituents.

All references cited herein are incorporated by reference in their entirety. While typical aspects have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

What is claimed is:

1. A copolycarbonate, comprising:

0.005-0.1 mole percent of sulfur-containing carbonate units derived from a sulfur-containing bisphenol monomer, 2-95 mole percent of high heat aromatic carbonate units derived from a high heat aromatic dihydroxy monomer, wherein the high heat aromatic dihydroxy monomer comprises a hydrogen on a benzylic carbon or a hydrogen on a tertiary carbon, and 5-98 mole percent of low heat carbonate units derived from a low heat aromatic monomer, each based on the sum of the moles of the carbonate units; and thioether carbonyl endcaps of the formula —C(=O)-L-S—R, wherein each occurrence of L is independently a $C_{1-12}$ aliphatic or aromatic linking group and R is a $C_{1-20}$ alkyl, $C_{6-18}$ aryl, or $C_{7-24}$ arylalkylene and wherein the thioether carbonyl endcaps are present in an amount effective to provide 5-70 parts per million by weight of added sulfur, based on the total parts by weight of the copolycarbonate;

wherein the sulfur-containing carbonate units are present in an amount effective to provide 5-30 parts per million by weight of added sulfur, based on the total parts by weight of the copolycarbonate.

2. The copolycarbonate of claim 1, comprising:

0.005-0.1 mole percent of the sulfur-containing carbonate units;

20-90 mole percent of the high heat carbonate units; and 10-80 mole percent of bisphenol A carbonate units as the low heat carbonate units.

3. The copolycarbonate of claim 1, wherein the high heat aromatic carbonate units are derived from 1,1-bis(4-hydroxyphenyl)-3,3,5-trimethyl-cyclohexane, and optionally, 4,4'-(1-phenylethylidene)bisphenol, 4,4'-(3,3-dimethyl-2,2-dihydro-1H-indene-1,1-diyl)diphenol, 1,1-bis(4-hydroxyphenyl)cyclododecane, 3,8-dihydroxy-5a,10b-diphenylcoumarano-2',3',2,3-coumarane, 2-phenyl-3,3'-bis(4-hydroxyphenyl) phthalimidine, or a combination thereof.

4. The copolycarbonate of claim 1, wherein the sulfur-containing bisphenol monomer is 4,4'-sulfonyldiphenol, 4,4'-sulfinyldiphenol, 4,4'-thiodiphenol, or a combination thereof.

5. The copolycarbonate of claim 1, wherein the endcaps are each independently of formulae

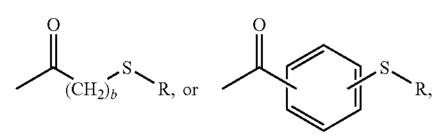

wherein R is a $C_{1-20}$ alkyl, $C_{6-18}$ aryl, or $C_{7-24}$ arylalkylene and b is 1-5.

6. A method of making the copolycarbonate of claim 1, the method comprising polymerizing a composition comprising:

0.005-0.1 mole percent of a sulfur-containing bisphenol monomer, 2-95 mole percent of a high heat aromatic dihydroxy monomer, wherein the high heat aromatic dihydroxy monomer comprises a hydrogen on a benzylic carbon or a hydrogen on a tertiary carbon, 5-98 mole percent of a low heat dihydroxy monomer, based on the sum of the moles of the carbonate units; and a thioether carbonyl endcapping agent of the formula G-C(=O)-L-S—R, wherein G is leaving group, L is a $C_{1-12}$ aliphatic or aromatic linking group and R is a $C_{1-20}$ alkyl, $C_{6-18}$ aryl, or $C_{7-24}$ arylalkylene and wherein the thioether carbonyl endcaps are present in an amount effective to provide 5-70 parts per million by weight of added sulfur, based on the total parts by weight of the copolycarbonate;

wherein the sulfur-containing bisphenol monomer units are present in an amount effective to provide 5-30 parts per million by weight of added sulfur, based on the total parts by weight of the copolycarbonate.

7. A thermoplastic composition comprising the copolycarbonate of claim 1, and further comprising an additive, wherein the additive is a sulfur-containing stabilizer compound that is soluble in an organic solvent for the copolycarbonate and is substantially insoluble in an aqueous solvent at a pH of less than 7, a organosulfonic stabilizer, an antioxidant, a heat stabilizer, a light stabilizer, a ultraviolet light stabilizer, a plasticizer, a lubricant, a mold release agent, an antistatic agents, a colorant, a surface effect additive, a radiation stabilizer, a flame retardant, an anti-drip agent, an impact modifier, or a combination thereof.

8. The thermoplastic composition of claim 7, wherein the sulfur-containing stabilizer compound is present, and comprises a $C_{6-40}$ hydrocarbon chain.

9. The thermoplastic composition of claim 7, wherein the sulfur-containing stabilizer compound is a thioether carboxy compound, a thioether dicarboxy compound, a thioether ester compound, or a combination thereof.

10. The thermoplastic composition of claim 7, wherein the sulfur-containing stabilizer compound is dilauryl thiodipropionate, dicetyl thiodipropionate, dimyristyl thiodipropionate, distearyl thiodipropionate, ditridecyl thiodipropionate, 2,2-bis[[3-(dodecylthio)-1-oxopropoxy]methyl] propane-1,3-diyl bis[3-(dodecylthio)propionate, or a combination thereof.

11. The thermoplastic composition of any claim 7, wherein the sulfur-containing stabilizer compound is present in an amount effective to provide 5-50 parts per million by weight of sulfur, based on the total parts by weight of the copolycarbonate.

12. The thermoplastic composition of claim 7, wherein the organosulfonic stabilizer is present in an amount effective to provide 2-40 ppm per million by weight of sulfur, based on the total parts by weight of the copolycarbonate.

13. The thermoplastic composition of claim 7, having at least one of:

less than 5 parts per million by weight each of lithium, sodium, potassium, calcium, magnesium, ammonium, chlorine, bromine, fluorine, nitrite, nitrate, phosphite, phosphate, sulfate, formate, acetate, citrate, oxalate, trimethylammonium, triethylammonium, or a combination thereof as measured by ion chromatography;

the copolycarbonate is prepared from monomers wherein one or more of the monomers has a purity of at least 99.6% as determined by high performance liquid chromatography; or a yellowness index of less than or equal to 30 as measured by ASTM D1925 on a 3.2 mm plaque.

14. An article comprising the thermoplastic composition of claim 7, wherein the article is optionally a camera lens, a sensor lens, an illumination lens, a safety glass lens, an ophthalmic corrective lens, or an imaging lens, optionally where the lens is hardcoated.

15. The copolycarbonate of claim 1, wherein the thioether carbonyl endcaps are each independently of the formula

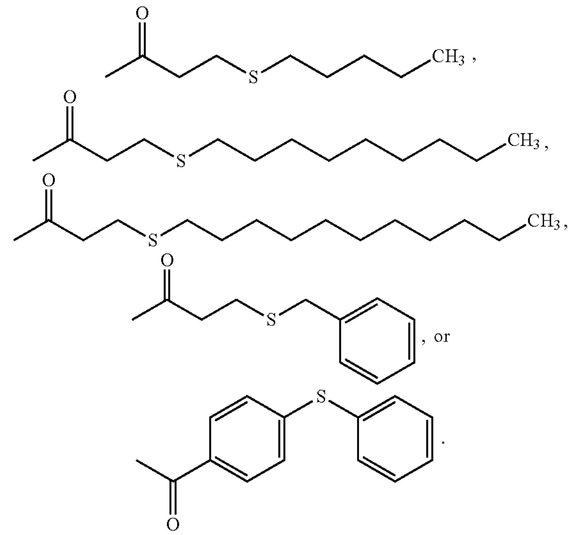

16. The copolycarbonate of claim 1, wherein the high heat aromatic carbonate units are derived from 1,1-bis(4-hydroxyphenyl)-3,3,5-trimethyl-cyclohexane, and 2-phenyl-3, 3'-bis(4-hydroxyphenyl) phthalimidine, 4,4'-(1-phenylethylidene)bisphenol, 4,4'-(3,3-dimethyl-2,2-dihydro-1H-indene-1,1-diyl)diphenol, 1,1-bis(4-hydroxyphenyl)cyclododecane, 3,8-dihydroxy-5a,10b-diphenyl-coumarano-2',3',2,3-coumarane, or a combination thereof.

17. The copolycarbonate of claim 1, wherein the high heat aromatic carbonate units are derived from 1,1-bis(4-hydroxyphenyl)-3,3,5-trimethyl-cyclohexane and the low heat carbonate units are present and are derived from bisphenol A.

18. The copolycarbonate of claim 1, wherein the high heat aromatic carbonate units are derived from 1,1-bis(4-hydroxyphenyl)-3,3,5-trimethyl-cyclohexane and 2-phenyl-3, 3'-bis(4-hydroxyphenyl) phthalimidine, and the low heat carbonate units are present and are derived from bisphenol A.

19. The thermoplastic composition of claim 10, wherein the high heat aromatic carbonate units are derived from 1,1-bis(4-hydroxyphenyl)-3,3,5-trimethyl-cyclohexane and optionally, 2-phenyl-3,3'-bis(4-hydroxyphenyl) phthalimidine, and the low heat carbonate units are present and are derived from bisphenol A, the sulfur-containing bisphenol monomer is 4,4'-sulfonyldiphenol, 4,4'-sulfinyldiphenol, 4,4'-thiodiphenol, or a combination thereof, and the sulfur-containing stabilizer compound is 2,2-bis[[3-(dodecylthio)-1-oxopropoxy]methyl]propane-1,3-diyl bis[3-(dodecylthio)propionate.

* * * * *